US011657369B2

(12) United States Patent
Kuroda

(10) Patent No.: US 11,657,369 B2
(45) Date of Patent: May 23, 2023

(54) COOPERATIVE PLANNING SYSTEM, COOPERATIVE PLANNING METHOD, AND COOPERATIVE PLANNING PROGRAM

(71) Applicant: NEC Corporation, Tokyo (JP)

(72) Inventor: Takayuki Kuroda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 773 days.

(21) Appl. No.: 16/342,569

(22) PCT Filed: Aug. 16, 2017

(86) PCT No.: PCT/JP2017/029475
§ 371 (c)(1),
(2) Date: Apr. 17, 2019

(87) PCT Pub. No.: WO2018/074042
PCT Pub. Date: Apr. 26, 2018

(65) Prior Publication Data
US 2020/0051027 A1 Feb. 13, 2020

(30) Foreign Application Priority Data
Oct. 20, 2016 (JP) .............................. JP2016-205841

(51) Int. Cl.
*G06Q 10/101* (2023.01)
*G06F 16/25* (2019.01)
*G06Q 10/10* (2023.01)

(52) U.S. Cl.
CPC ......... *G06Q 10/101* (2013.01); *G06F 16/258* (2019.01); *G06Q 10/103* (2013.01)

(58) Field of Classification Search
None
See application file for complete search history.

(56) References Cited

U.S. PATENT DOCUMENTS 5,127,104 A * 6/1992 Dennis ................. G06F 9/4494
712/201
6,615,166 B1 * 9/2003 Guheen ................. G06Q 10/06
703/27

(Continued)

FOREIGN PATENT DOCUMENTS

| JP | 2015215885 A | 12/2015 |
| JP | 2015215886 A | 12/2015 |
| JP | 2015215887 A | 12/2015 |

OTHER PUBLICATIONS

Kuroda, Model-based IT Change Managemnt for La.rge System Definitions with State-related Depndencise, IEEE, 2014.*

(Continued)

*Primary Examiner* — Peter Ludwig
*Assistant Examiner* — Donald J Edmonds
(74) *Attorney, Agent, or Firm* — Sughrue Mion, PLLC

(57) ABSTRACT

A generating unit 30 which is included in a cooperative planning system 10: generates a plurality of partial procedures by dividing the generated change procedure for each procedure which relates to an element of each of the system configurations; with respect to a first partial procedure which includes a first step after which, when execution is completed, execution is commenced of a second step which is included in a second partial procedure, adds, after the first step, a step in which information is inputted to the planning system which executes the second partial procedure, said information indicating the completion of the procedure; and with respect to the second partial procedure, adds, prior to the second step, a step in which information is inputted from the planning system which executes the first partial procedure, said information indicating the completion of the procedure.

20 Claims, 34 Drawing Sheets

(56) References Cited

U.S. PATENT DOCUMENTS

| | | | | |
|---|---|---|---|---|
| 6,704,737 | B1* | 3/2004 | Nixon | G06F 16/27 707/999.102 |
| 7,039,597 | B1* | 5/2006 | Notani | G06Q 10/06 705/7.13 |
| 2006/0179028 | A1* | 8/2006 | Bram | G06N 5/043 706/47 |
| 2008/0256549 | A1* | 10/2008 | Liu | G06F 9/5066 718/106 |
| 2009/0049438 | A1* | 2/2009 | Draper | G06F 8/34 717/168 |
| 2009/0257456 | A1* | 10/2009 | Carlson | H04J 3/0641 370/503 |
| 2010/0251247 | A1* | 9/2010 | Pedersen | H04L 41/00 718/102 |
| 2010/0257260 | A1* | 10/2010 | Vishnia-Shabtai | G06F 16/00 709/222 |
| 2011/0302199 | A1* | 12/2011 | Wada | G06F 16/20 707/769 |
| 2012/0245972 | A1* | 9/2012 | Sorgie | G06Q 30/06 705/7.28 |
| 2012/0284710 | A1* | 11/2012 | Vinberg | G06F 9/45533 718/1 |
| 2013/0080721 | A1* | 3/2013 | Tomiyama | G06F 3/0644 711/161 |
| 2014/0013065 | A1* | 1/2014 | Arakawa | G06F 21/6254 711/154 |
| 2014/0075413 | A1* | 3/2014 | Binjrajka | G06F 8/30 717/121 |
| 2015/0278701 | A1* | 10/2015 | Danielsson | H04L 67/10 706/47 |
| 2015/0323916 | A1 | 11/2015 | Kuroda et al. | |
| 2015/0324305 | A1* | 11/2015 | Kuroda | G05B 19/045 710/300 |
| 2016/0217423 | A1* | 7/2016 | Magnan | G06Q 10/103 |
| 2016/0267417 | A1* | 9/2016 | Tomiyama | G06Q 10/06313 |

OTHER PUBLICATIONS

Takayuki Kuroda et al., "Model-based IT Change Management for large System Definitions with State-related Dependencies" 2014 IEEE 18th International Enterprise Distributed Object Computing Conference, Sep. 2014, pp. 170-179 (10 pages total).

Takayuki Kuroda et al.,"Adding Exchangeability of Deployment Agent to Template-based Provisioning", IPSJ SIG Notes, vol. 2016-IOT-32, No. 25, Feb. 25, 2016, pp. 1-8 (10 pages total).

Yasuharu Katsuno et al., "Install Izon Kankei ga aru Composite Application Server no Kosoku Deployment", IEICE Technical Report, vol. 115, No. 61, May 21, 2015, pp. 101-108 (8 pages total).

International Search Report dated Nov. 7, 2017, in counterpart International Application No. PCT/JP2017/029475.

Written Opinion of the International Searching Authority dated Nov. 7, 2017, in counterpart International Application No. PCT/JP2017/029475.

* cited by examiner

FIG. 3

```
{
  "DOCUMENT TYPE":"SYSTEM CONFIGURATION DEFINITION",
  "CONSTITUENT ELEMENT":{
    "e1":{
      "STATE":["s1","s2"],
      "STATE TRANSITION":["s1 -> s2","s2 -> s1"],
      "CURRENT STATE":"s2",
      "TARGET STATE":"s2",
      "PRIOR STATE CONSTRAINT":{
        "s1 -> s2":["DN::e1.s1"],
        "s2 -> s1":["e2.s1"]
      },
      "IMPOSED PRIOR STATE CONSTRAINT":{
        "D1::e1(s1 -> s2)":"s1"
      }
    },
    "e2":{
      "STATE":["s1","s2"],
      "STATE TRANSITION":["s1 -> s2","s2 -> s1"],
      "CURRENT STATE":"s2",
      "PRIOR STATE CONSTRAINT":{},
      "IMPOSED PRIOR STATE CONSTRAINT":{
        "e2(s2 -> s1)":"s1"
      }
    }
  }
}
```

FIG. 4

```
{
  "DOCUMENT TYPE":"CONFIGURATION CHANGE REQUEST",
  "INTENDED CONFIGURATION":{
    "e1":{
      "TARGET STATE":"s2"
    }
  }
}
```

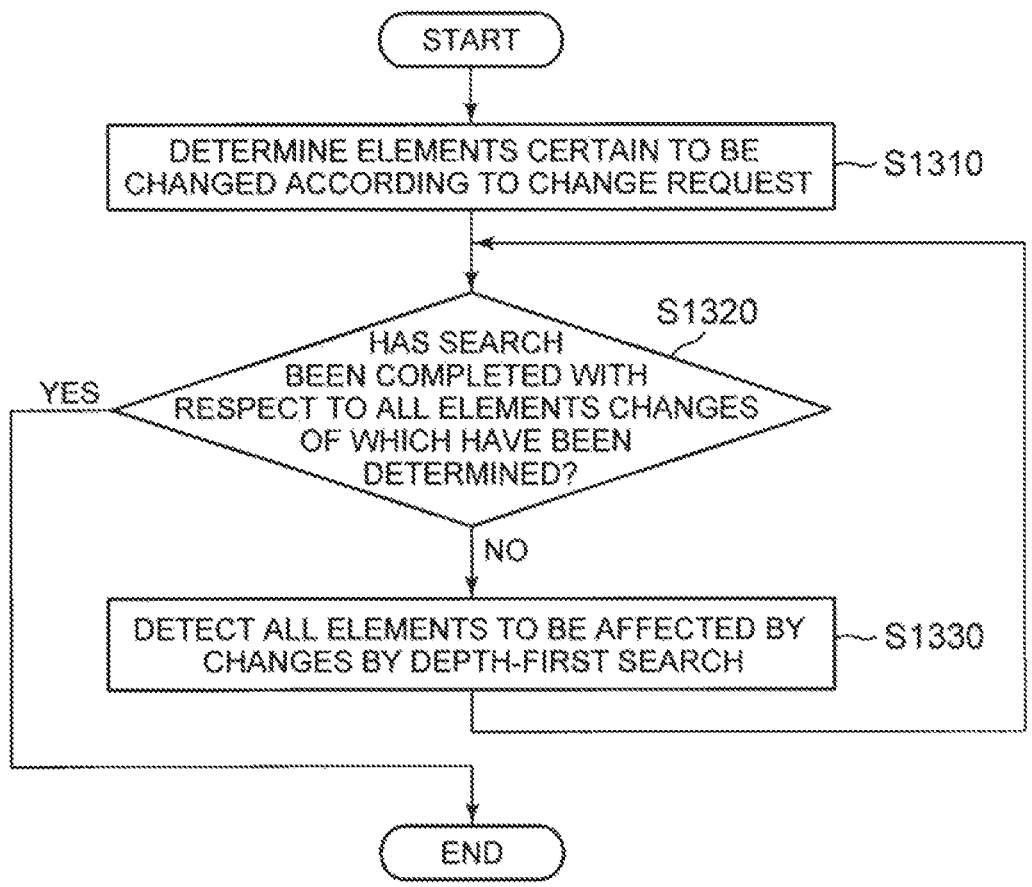

FIG. 11
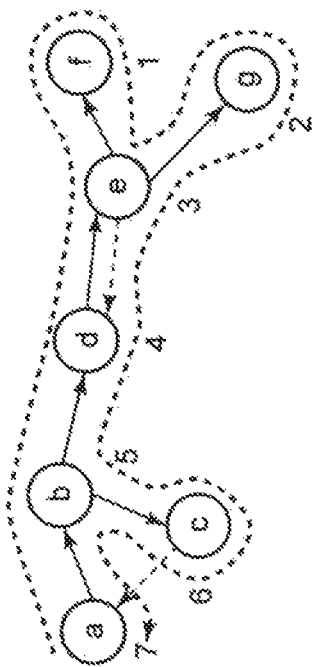
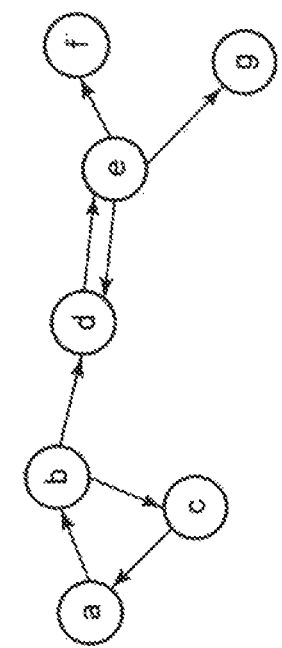
1. INPUT GRAPH
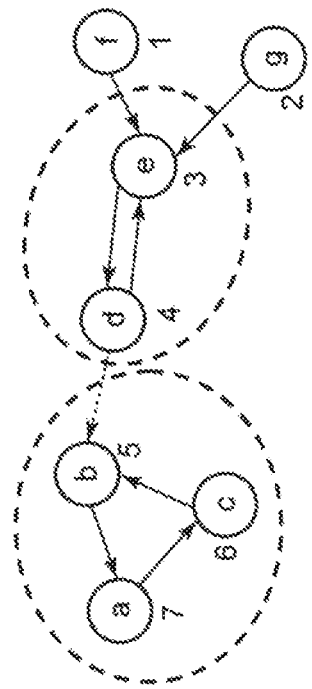
2. AFTER ASSIGNMENT OF NUMBERS, STARTING FROM DEEP NODE
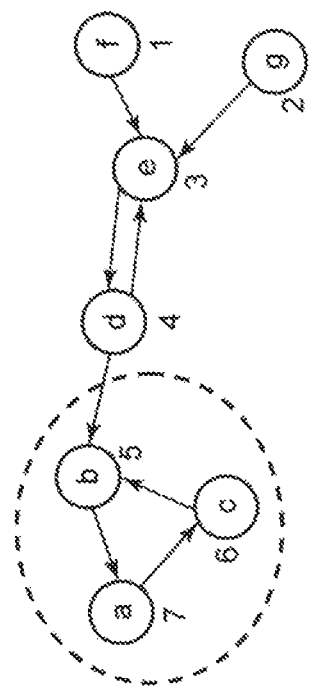
3. DECOMPOSITION PROCESS PART 1
4. DECOMPOSITION PROCESS PART 2

FIG. 14

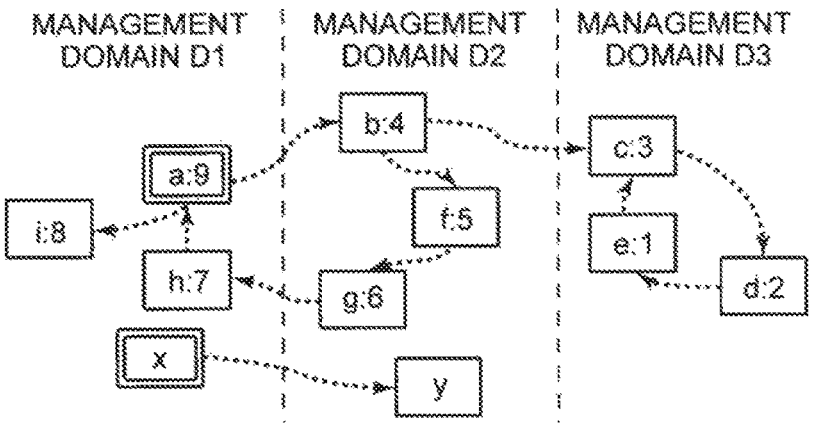

FIG. 15

```
{
 "REQUIREMENT":"GROUPING FORWARD SEARCH",
 "LARGEST NUMBER":{
   "LARGEST NUMBER":6,
   "ELEMENT id":"g"
 },
 "STATE ELEMENT":{
   "b":{"NUMBER":"4"},
   "f":{"NUMBER":"5"},
   "g":{"NUMBER":"6"}
 }
}
```

FIG. 16

REQUEST MESSAGE

```
{
 "CHANGE id":"D1_1",
 "REQUIREMENT":"GROUPING FORWARD
               SEARCH REQUEST",
 "From":"D2::g",
 "To":"D1::h",
 "LARGEST NUMBER":"6"
}
```

REPLY MESSAGE

```
{
 "CHANGE id":"D1_1",
 "REQUIREMENT":"GROUPING FORWARD
               SEARCH REPLY",
 "From":"D1::h",
 "To":"D2::g",
 "LARGEST NUMBER":"7"
}
```

FIG. 19

MANAGEMENT DOMAIN D1

```
{
 "REQUIREMENT":"GROUPING",
 "GROUP":{
  "D1::G1":{
   "MEMBER":["a","h"],
   "RELATED DOMAIN":["D2"]
  }
 },
 "LARGEST NUMBER":{
  "LARGEST NUMBER":"8",
  "STATE ELEMENT id":"i"
 },
 "STATE ELEMENT":{
  "a":{"NUMBER":"9","GROUP":"D1::G1"},
  "h":{"NUMBER":"7","GROUP":"D1::G1"},
  "i":{"NUMBER":"8","GROUP":""}
 }
}
```

MANAGEMENT DOMAIN D2

```
{
 "REQUIREMENT":"GROUPING",
 "GROUP":{
  "D1::G1":{
   "MEMBER":["b","f","g"],
   "RELATED DOMAIN":["D1"]
  }
 },
 "LARGEST NUMBER":{
  "LARGEST NUMBER":"10",
  "STATE ELEMENT id":"y"
 },
 "STATE ELEMENT":{
  "b":{"NUMBER":"4","GROUP":"D1::G1"},
  "f":{"NUMBER":"5","GROUP":"D1::G1"},
  "g":{"NUMBER":"6","GROUP":"D1::G1"}
 }
}
```

FIG. 20

REQUEST MESSAGE

```
{
 "CHANGE id":"D1_1",
 "REQUIREMENT":"GROUPING BACKWARD
                SEARCH REQUEST",
 "From":"D1::h",
 "To":"D2::g",
 "GROUP id":"D1::G1"
}
```

REPLY MESSAGE

```
{
 "CHANGE id":"D1_1",
 "REQUIREMENT":"GROUPING BACKWARD
                SEARCH REPLY",
 "From":"D2::g",
 "To":"D1::h",
 "GROUP id":"D1::G1",
 "PARTICIPATION IN GROUP":"YES"
}
```

FIG. 24

REQUEST MESSAGE

```
{
"CHANGE id":"D1_1",
"REQUIREMENT":"PROCEDURE SEARCH REQUEST",
"From":"D1",
"To":"COMBINING UNIT",
"GROUP id":"D1::G1",
"MEMBER":{
  "a":{
    "STATE":["s1","s2"],
    "STATE TRANSITION":["s1 -> s2","s2 -> s1"],
    "CURRENT STATE":"s1",
    "TARGET STATE":"s2",
    "PRIOR STATE CONSTRAINT":{
      "s1 -> s2":["D2::b.s1"]
    }
  },
  "h":{OMITTED}
},
"RELATED DOMAIN":["D2"]
}
```

REPLY MESSAGE

```
{
"CHANGE id":"D1_1",
"REQUIREMENT":"PROCEDURE SEARCH REPLY",
"From":"COMBINING UNIT",
"To":"D1",
"GROUP id":"D1::G1",
"PROCEDURE":{
  "D1::G1.x":[],
  "a(s1->s2)":["D1::G1.x"],
  "h(s1->s2)":["a(s1->s2)"],
  "D1::G1.y":["h(s1->s2)"]
}
}
```

```
{
  "CHANGE id":"D1_1",
  "GROUP id":"D1::G1",
  "MEMBER":{
    "D1":{
      "a":{
        "STATE":["s1","s2"],
        "STATE TRANSITION":["s1 -> s2","s2 -> s1"],
        "CURRENT STATE":"s1",
        "TARGET STATE":"s2",
        "PRIOR STATE CONSTRAINT":{
          "s1 -> s2":["D2::b,s1"]
        }
      },
      "h":{OMITTED}
    },
    "D2":{
      "b":{OMITTED},
      "f":{OMITTED},
      "g":{OMITTED}
    }
  },
  "RELATED DOMAIN":["D1","D2"]
}
```

FIG. 30

MANAGEMENT DOMAIN D1

```
{
  "REPRODUCTION INFORMATION":{
    "STATE ELEMENT":{
      "xx1":{
        "id":"vm1",
        "states":{
          "ss1":"f",
          "ss2":"t"
        }
      },
      "xx2":{
        "id":"redundant"
      }
    },
    "FIELD":{
      "gg1":{
        "id":"component1.redundant"
      }
    }
  },
  "ANONYMIZATION INFORMATION":{
    "STATE ELEMENT":{
      "vm1":{
        id:"xx1",
        REST IS OMITTED
      }
    },
    "FIELD":{OMITTED}
  }
}
```

MANAGEMENT DOMAIN D2

```
{
  "REPRODUCTION INFORMATION":{
    "STATE ELEMENT":{
      "yy1":{
        "id":"functionX",
        "states":{
          "ss1":"f",
          "ss2":"t"
        }
      }
    },
    "FIELD":{
      "ff1":{
        "id":"component2.vm21"
      },
      "ff2":{
        "id":"component2.functionX"
      }
    }
  },
  "ANONYMIZATION INFORMATION":{OMITTED}
}
```

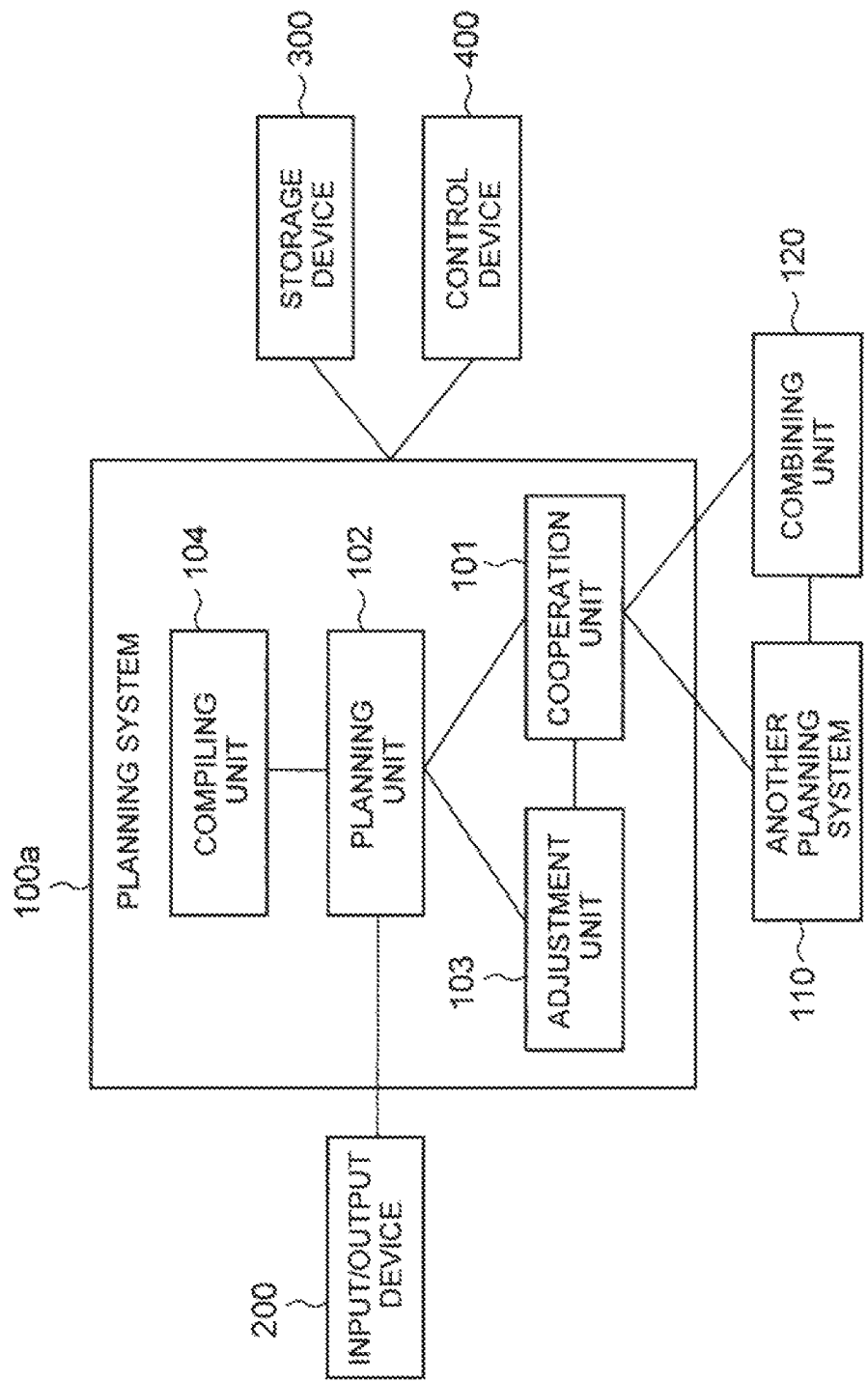

MANAGEMENT DOMAIN D1 | MANAGEMENT DOMAIN D2

FIG. 41

REQUEST MESSAGE

```
{
  "CHANGE id":"D1_2",
  "REQUIREMENT":"COMPILATION
               START REQUEST",
  "From":"D1::component1.reference1",
  "To":"D2::component2.service2"
}
```

REPLY MESSAGE

```
{
  "CHANGE id":"D1_2",
  "REQUIREMENT":"COMPILATION
               START REPLY",
  "From":"D2::component2.service2",
  "To":"D1::component1.reference1"
}
```

FIG. 42

REQUEST MESSAGE

```
{
  "CHANGE id":"D1_2",
  "REQUIREMENT":"MANAGEMENT
               FIELD SEARCH REQUEST",
  "From":"D1::component1.reference1.vm",
  "To":"D2::component2.service2.vm",
  "STATE ELEMENT":"D1::vm1"
}
```

REPLY MESSAGE

```
{
  "CHANGE id":"D1_2",
  "REQUIREMENT":"MANAGEMENT
               FIELD SEARCH REPLY",
  "From":"D2::component2.service2.vm",
  "To":"D1::component1.reference1.vm",
  "STATE ELEMENT":"D1::vm1",
  "MANAGEMENT FIELD":
          "D2::component2.vm21"
}
```

FIG. 43

MANAGEMENT DOMAIN D1

```
{
  "CHANGE id":"D1_2",
  "STATE ELEMENT":{
    "vm1":{
      "START FIELD":"component1.vm11",
      "MANAGEMENT FIELD":"D2::component2.vm21",
      "CONNECTION PATH":{
        "component1.vm11":{
          "MAIN CONNECTION PATH":"yes",
          "NEXT FIELD":["component1.reference1.vm"],
          "PREVIOUS FIELD":none
        },
        "component1.reference1.vm":{
          "MAIN CONNECTION PATH":"yes",
          "NEXT FIELD":["D2::component2.service2.vm"],
          "PREVIOUS FIELD":"component1.reference1.vm"
        }
      }
    },
    "D2::functionX2":{
      "START FIELD":none,
      "CONNECTION PATH":{
        "component1.reference1.functionX":{
          "MAIN CONNECTION PATH":"no",
          "NEXT FIELD":none,
          "PREVIOUS FIELD":"D2::component2.service2.functionX"
        }
      }
    },
    "vm2":{
      "START FIELD":"component1.vm12",
      "MANAGEMENT FIELD":"component1.vm12",
      "CONNECTION PATH":{
        "component1.vm12":{
          "MAIN CONNECTION PATH":"yes",
          "NEXT FIELD":none,
          "PREVIOUS FIELD":none
        }
      }
    },
    "redundant":{OMITTED},
    "agentD1":{OMITTED}
  },
  "MANAGEMENT FIELD":{
    "vm2":"component1.vm12",
    "redundant":"component1.redundant",
    "agentD1":"component1.agent1"
  }
}
```

FIG. 44

MANAGEMENT DOMAIN D2

```
{
  "CHANGE id":"D1_2",
  "STATE ELEMENT":{
   "D1::vm1":{
     "START FIELD":none,
     "CONNECTION PATH":{
       "component2.service2.vm":{
         "MAIN CONNECTION PATH":"yes",
         "NEXT FIELD":["component2.vm21"],
         "PREVIOUS FIELD":"D1::component1.reference1.vm"
       },
       "component2.vm21":{
         "MAIN CONNECTION PATH":"yes",
         "NEXT FIELD":none,
         "PREVIOUS FIELD":"component2.service2.vm"
       }
     }
   },
   "functionX2":{
     "START FIELD":"component2.functionX",
     "MANAGEMENT FIELD":"component2.functionX",
     "CONNECTION PATH":{
       "component2.functionX":{
         "MAIN CONNECTION PATH":"yes",
         "NEXT FIELD":["component2.service2.functionX"],
         "PREVIOUS FIELD":none
       },
       "component2.service2.functionX":{
         "MAIN CONNECTION PATH":"no",
         "NEXT FIELD":["D1::component1.reference1.functionX"],
         "PREVIOUS FIELD":"component2.functionX"
       }
     }
   },
   "agentD2":{OMITTED}
  },
  "MANAGEMENT FIELD":{
   "D1::vm1":"component2.vm21",
   "functionX2":"component2.functionX",
   "agentD2":"component2.agent2"
  }
}
```

FIG. 45

MANAGEMENT DOMAIN D1

```
{
"CHANGE id":"D1_2",
"STATE ELEMENT":{OMITTED},
"FIELD":{
  "component1.vm11":{
    "STATE ELEMENT":{
      "vm1":{"MANAGEMENT FIELD":"D2::component2.vm21"}
    }
  },
  "component1.vm12":{
    "STATE ELEMENT":{
      "vm2":{"MANAGEMENT FIELD":"D2::component2.vm21"}
    }
  },
  "component1.reference1.vm":{
    "STATE ELEMENT":{
      "vm1":{"MANAGEMENT FIELD":"component1.vm12"}
    }
  },
  "component1.reference1.functionX":{
    "STATE ELEMENT":{
      "functionX2":{"MANAGEMENT FIELD":"D2::component2.functionX"}
    }
  },
  "component1.redundant":{OMITTED},
  "component1.agent1":{OMITTED}
}
}
```

MANAGEMENT DOMAIN D2

```
{
"CHANGE id":"D1_2",
"STATE ELEMENT":{OMITTED},
"FIELD":{
  "component2.vm21":{
    "STATE ELEMENT":{
      "D1::vm1":{"MANAGEMENT FIELD":"D2::component2.vm21"}
    }
  },
  "component2.functionX":{
    "STATE ELEMENT":{
      "functionX2":{"MANAGEMENT FIELD":"D2::component2.functionX"}
    }
  },
  "component2.service2.vm":{
    "STATE ELEMENT":{
      "D1::vm1":{"MANAGEMENT FIELD":"component2.vm21"}
    }
  },
  "component2.service2.functionX":{
    "STATE ELEMENT":{
      "functionX2":{"MANAGEMENT FIELD":"D2::component2.functionX"}
    }
  },
  "component2.agent2":{OMITTED}
}
}
```

FIG. 46

REQUEST MESSAGE

```
{
"CHANGE id":"D1_2",
"REQUIREMENT":"RELATIONSHIP GATHERING REQUEST",
"From":"D2::component2.service2.vm",
"To":"D1::component1.reference1.vm",
"STATE ELEMENT":"D1::vm1"
}
```

REPLY MESSAGE

```
{
"CHANGE id":"D1_2",
"REQUIREMENT":"RELATIONSHIP GATHERING REPLY",
"From":"D1::component1.reference1.vm",
"To":"D2::component2.service2.vm",
"STATE ELEMENT":"D1::vm1",
"RELATIONSHIP":{
 "PRIOR STATE CONSTRAINT":{
  "D1::vm1@D2::component2.vm21(f <-> f)":"D2::functionX2
                                          @D2::component2.functionX"
 },
 "IMPOSED CONSTRAINT CONDITION":{
  "D1::redundant@D1::component1.redundant":"D1::vm1
                                          @D2::component2.vm21"
 }
}
}
```

FIG. 47

MANAGEMENT DOMAIN D1

```
{
"CHANGE id":"D1_2",
"STATE ELEMENT":{
  "vm2":{
    "MANAGEMENT FIELD":"component1.vm12",
    "RELATIONSHIP":{
      "PRIOR STATE CONSTRAINT":{
        "D1::vm2@D1::component1.vm12(f <=> f),"D2::functionX2
                                      @D2::component2.functionX"
      },
      "IMPOSED CONSTRAINT CONDITION":{
        "D1::redundant@D1::component1.redundant":"D1::vm2
                                      @D1::component1.vm12"
      }
    }
  },
  "redundant":{
    "MANAGEMENT FIELD":"component1.redundant",
    "RELATIONSHIP":{}
  },
  "agentD1":{
    "MANAGEMENT FIELD":"component1.agent1",
    "RELATIONSHIP":{}
  }
```

MANAGEMENT DOMAIN D2

```
{
"CHANGE id":"D1_2",
"STATE ELEMENT":{
  "D1::vm1":{
    "MANAGEMENT FIELD":"component2.vm21",
    "RELATIONSHIP":{
      "PRIOR STATE CONSTRAINT":{
        "D1::vm1@D2::component2.vm21(f <=> f),"D2::functionX2
                                      @D2::component2.functionX"
      },
      "IMPOSED CONSTRAINT CONDITION":{
        "D1::redundant@D1::component1.redundant":"D1::vm1@D2::component2.vm21"
      }
    }
  },
  "functionX2":{
    "MANAGEMENT FIELD":"component2.functionX",
    "RELATIONSHIP":{
      "IMPOSED PRIOR STATE CONSTRAINT":{
        "D1::vm1@D2::component2.vm21(f <=> f),"D2::functionX2
                                      @D2::component2.functionX",
        "D1::vm2@D1::component1.vm12(f <=> f),"D2::functionX2
                                      @D2::component2.functionX"
      }
    }
  },
  "agentD2":{
    "MANAGEMENT FIELD":"component2.agent2",
    "RELATIONSHIP":{}
```

FIG. 48

REQUEST MESSAGE
```
{
"CHANGE id":"D1_2",
"REQUIREMENT":"MANAGEMENT
        FIELD SEARCH REQUEST",
"From":"D1::component1.reference1.vm",
"To":"D2::component2.service2.vm",
"STATE ELEMENT":"D1::xx1"
}
```

REPLY MESSAGE
```
{
"CHANGE id":"D1_2",
"REQUIREMENT":"MANAGEMENT
        FIELD SEARCH REPLY",
"From":"D2::component2.service2.vm",
"To":"D1::component1.reference1.vm",
"STATE ELEMENT":"D1::xx1",
"MANAGEMENT FIELD":"D2::ff1"
}
```

FIG. 49

REQUEST MESSAGE
```
{
"CHANGE id":"D1_2",
"REQUIREMENT":"RELATIONSHIP
        GATHERING REQUEST",
"From":"D2::component2.service2.vm",
"To":"D1::component1.reference1.vm",
"STATE ELEMENT":"D1::xx1"
}
```

REPLY MESSAGE
```
{
"CHANGE id":"D1_2",
"REQUIREMENT":"RELATIONSHIP
        GATHERING REPLY",
"From":"D1::component1.reference1.vm",
"To":"D2::component2.service2.vm",
"STATE ELEMENT":"D1::xx1",
"RELATIONSHIP":{
  "PRIOR STATE CONSTRAINT":{
    "D1::xxx@D2::fff(ss1 <-> ss2)":"D2::yy1@D2::ff2"
  },
  "IMPOSED CONSTRAINT CONDITION":{
    "D1::xx2@D1::gg1":"D1::xx1@D2::ff1"
  }
}
}
```

FIG. 50

REQUEST MESSAGE

```
{
"CHANGE id":"D1_1",
"REQUIREMENT":"PROCEDURE
              SEARCH REQUEST",
"From":"D1",
"To":"COMBINING UNIT",
"GROUP id":"D1::G1",
"MEMBER":{
 "g2h":{
    "STATE":["zOe","Xp3"],
    "STATE TRANSITION":["zOe -> Xp3","Xp3->zOe"],
    "CURRENT STATE":"zOe",
    "TARGET STATE":"Xp3",
    "PRIOR STATE CONSTRAINT":{
       "zOe ->Xp3":["D2::lqx.b4y"]
    }
 },
 "n1z":{OMITTED}
},
"RELATED DOMAIN":["D2"]
}
```

REPLY MESSAGE

```
{
"CHANGE id":"D1_1",
"REQUIREMENT":"PROCEDURE
              SEARCH REPLY",
"From":"COMBINING UNIT",
"To":"D1",
"GROUP id":"D1::G1",
"PROCEDURE":{
 "D1::G1.x":[],
 "g2h(zOe->Xp3)":["D1::G1.x"],
 "n1z(cig->zw0)":["g2h(zOe->Xp3)"],
 "D1::G1.y":["n1z(cig->zw0)"]
}
}
```

FIG. 51

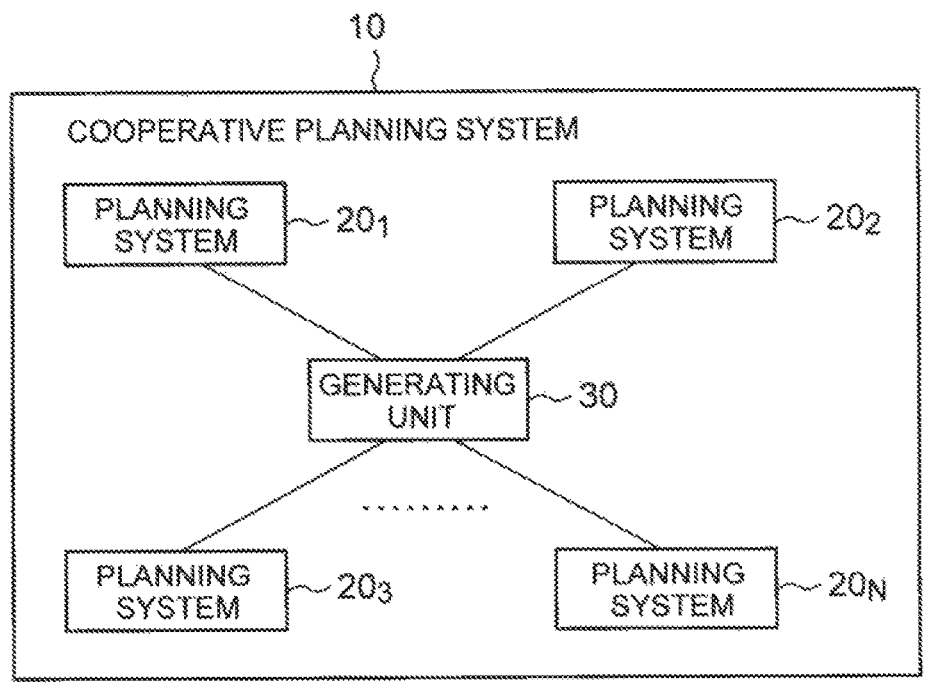

COOPERATIVE PLANNING SYSTEM, COOPERATIVE PLANNING METHOD, AND COOPERATIVE PLANNING PROGRAM

This application is a National Stage Entry of PCT/JP2017/029475 filed on Aug. 16, 2017, which claims priority from Japanese Patent Application 2016-205841 filed on Oct. 20, 2016, the contents of all of which are incorporated herein by reference, in their entirety.

TECHNICAL FIELD

The present invention relates to a cooperative planning system, a cooperative planning method, and a cooperative planning program.

BACKGROUND ART

Preparatory work prior to changing a configuration of Information and Communication Technology (ICT) system includes configuration design and procedure planning. The configuration design is the work of designing an intended system configuration to be implemented by configuration change. In addition, the procedure planning is the work of planning the work of configuration change for implementing the intended system configuration which has been designed.

In planning a procedure, it is necessary to consider various requirements depending on the situation. For example, in order for all tasks to be executed normally, it is necessary to take into consideration dependency relationships between components included in a system to be changed. In addition, in the case where the system provides important services, it is also necessary that consideration be given to conditions for keeping the services stably provided during the work of system change.

Therefore, in the case of planning the work of changing the configuration of a large-scale and complicated system, the level of difficulty in the work of configuration change and the level of man-hours involved in the work of configuration change become a problem. Therefore, it is necessary to take into consideration a requirement that the level of difficulty not be too high and a requirement that man-hours not excessively increase.

PTLs 1 to 3 and NPL 1 describe a planning system capable of solving the above problem. In the case of using the planning system, a user can generate a change procedure for implementing a configuration change, simply by inputting, to the planning system, a definition of an intended system configuration.

In a method in which the planning system is used, there is defined information on various individual tasks included in a series of change procedures. In addition, dependency relationships between components and other requirements are prescribed as general-purpose constraint conditions. Furthermore, the configuration of the system to be changed is managed as a system configuration definition.

By using the above-described information, the planning system extracts tasks necessary for the configuration change from the difference between a system configuration definition representing the intended configuration and a system configuration definition representing a current configuration. Next, the planning system automatically generates a change procedure by arranging the tasks extracted in consideration of the constraint conditions in appropriate order.

In the method in which the planning system is used, the planning system performs the procedure planning. Thus, the method using the planning system has the advantages of generating the easier work of system configuration change and reducing man-hours to be involved in the procedure planning.

Furthermore, unlike the case of a tool that simply controls a system in an automatic manner, when the planning system is used, a work procedure is specified before the work of change is performed. That is, the method in which the planning system is used also has a significant advantage in that a user can confirm, agree, and understand in advance the influence of the work of change, and can perform the work of change with a sense of security.

For example, in the case where there is defined a constraint to the effect that a service provided by a virtual machine (hereinafter also referred to as a VM) depends on the VM, a work procedure to be generated when a stop of the VM is requested includes the work of stopping the service. Therefore, before performing the work of stopping the VM, the user can recognize that the service will be stopped in the case where the VM is stopped.

If the planning system generates the work of changing the configuration of a large-scale system, the user can mechanically track other changes caused by a part of the change, on the basis of the generated work of changing the configuration over a wide range. That is, the user can verify in advance the influence of the work of configuration change which is difficult to confirm manually.

CITATION LIST

Patent Literature

PTL 1: Japanese Patent Application Laid-Open No. 2015-215885
PTL 2: Japanese Patent Application Laid-Open No. 2015-215886
PTL 3: Japanese Patent Application Laid-Open No. 2015-215887

Non Patent Literature

NPL 1: T. Kuroda and A. Gokhale, "Model-based it change management for large system definitions with state-related dependencies," in Enterprise Distributed Object Computing Conference (EDOC), 2014 IEEE 18th International, September 2014, pp. 170-179.

SUMMARY OF INVENTION

Technical Problem

However, in the case where a general planning system is used, configuration definitions of the system to be changed are required to be managed in one place due to constraints caused by a mechanism for the process of the procedure planning. Thus, the above advantages are not fully enjoyed.

In general, many systems have dependency relationships with external systems operated by different organizations. That is, many systems exist while affecting external systems and being affected by external systems.

For example, in the case where a system of Company A is operated on an infrastructure provided by Company B, the work of extending the system of Company A affects the amount of extra computational resources relating to the infrastructure of Company B. In addition, maintenance work on the infrastructure of Company B affects the operational status of the system of Company A.

Furthermore, in the case where Company X and Company Y jointly operate a system, and a module of Company X uses features provided by a module of Company Y, the work of changing a system configuration including the module of Company Y affects the operation of the module of Company X.

In the case where the work of configuration change is manually planned in each of the above situations, it is conceivable that the planned work of configuration change may be complicated. There is a possibility that the complicated work of configuration change, which has been planned, may involve much investigation of the influence of the work of configuration change and much cooperative work between organizations in making various adjustments. Utilization of a planning system that can plan the simpler work of configuration change is awaited so as to minimize, as far as possible, investigation of the influence and cooperative work between organizations.

However, uniform management of each system configuration of different organizations often becomes a problem in terms of an operational policy of each organization. That is, difficulty in uniform management of each system configuration of different organizations is a constraint on utilization of the planning system.

As described above, there is demand for a method for generating a procedure for changing a system configuration for allowing a series of the work of changing the system configuration, which affects a plurality of management domains, to be implemented by cooperative operation of each system in the case where a system managed in each of the plurality of management domains has an influence. However, it is difficult to generate a procedure for changing a system configuration while managing each system configuration of different organizations in a centralized manner.

In addition, for the reason described above, it is preferable that a procedure for changing a system configuration be generated even when there is no constituent element having an overall understanding. None of PTLs 1 to 3 and NPL 1 describes measures to address the above-described problems.

Object of Invention

Thus, it is an object of the present invention to provide a cooperative planning system, a cooperative planning method, and a cooperative planning program capable of generating, as a set of partial procedures generated in respective management domains, a procedure for changing a configuration of a system that affects a plurality of management domains, so as to solve the above-described problems.

Solution to Problem

A cooperative planning system according to the present invention includes: a plurality of planning systems, each of which manages a system configuration; and a generating unit which generates a change procedure in response to a request to change a plurality of system configurations, wherein the generating unit: generates the change procedure on the basis of a plurality of system configuration definitions which are inputted from the plurality of planning systems; generates a plurality of partial procedures by dividing the generated change procedure for each procedure which relates to an element of each of the system configurations; with respect to a first partial procedure which includes a first step after which, when execution is completed, execution is commenced of a second step which is included in a second partial procedure, adds, after the first step, a step in which information is inputted to the planning system which executes the second partial procedure, said information indicating the completion of the procedure; and with respect to the second partial procedure, adds, prior to the second step, a step in which information is inputted from the planning system which executes the first partial procedure, said information indicating the completion of the procedure.

A cooperative planning method according to the present invention is a cooperative planning method to be executed in a cooperative planning system that includes a plurality of planning systems, each of which manages a system configuration, and generates a change procedure in response to a request to change a plurality of system configurations, the method including: generating the change procedure on the basis of a plurality of system configuration definitions which are inputted from the plurality of planning systems; generating a plurality of partial procedures by dividing the generated change procedure for each procedure which relates to an element of each of the system configurations; with respect to a first partial procedure which includes a first step after which, when execution is completed, execution is commenced of a second step which is included in a second partial procedure, adding, after the first step, a step in which information is inputted to the planning system which executes the second partial procedure, said information indicating the completion of the procedure; and with respect to the second partial procedure, adding, prior to the second step, a step in which information is inputted from the planning system which executes the first partial procedure, said information indicating the completion of the procedure.

A cooperative planning program according to the present invention is a cooperative planning program to be executed in a computer that generates a change procedure in response to a request to change a plurality of system configurations, the computer including a plurality of planning systems, each of which manages a system configuration, the program causing the computer to perform: a first generation process of generating the change procedure on the basis of a plurality of system configuration definitions which are inputted from the plurality of planning systems; a second generation process of generating a plurality of partial procedures by dividing the generated change procedure for each procedure which relates to an element of each of the system configurations; a first adding process of, with respect to a first partial procedure which includes a first step after which, when execution is completed, execution is commenced of a second step which is included in a second partial procedure, adding, after the first step, a step in which information is inputted to the planning system which executes the second partial procedure, said information indicating the completion of the procedure; and a second adding process of, with respect to the second partial procedure, adding, prior to the second step, a step in which information is inputted from the planning system which executes the first partial procedure, said information indicating the completion of the procedure.

Advantageous Effects of Invention

According to the present invention, it is possible to generate, as a set of partial procedures generated in respective management domains, a procedure for changing a configuration of a system that affects a plurality of management domains.

BRIEF DESCRIPTION OF DRAWINGS

FIG. 3 is an explanatory diagram showing an example of a system configuration definition.

FIG. 4 is an explanatory diagram showing an example of a request to change a system configuration.

FIG. 9 is a flowchart showing the operation of a process of extracting a scope of influence, to be performed by an adjustment unit 103 according to the first exemplary embodiment.

FIG. 10 is an explanatory diagram showing an example of recorded information for each management domain during the process of extracting a scope of influence.

FIG. 11 is an explanatory diagram showing an example of a process of division into strongly connected components.

FIG. 14 is an explanatory diagram showing an example of state elements to which numbers to be used for division into groups have been assigned.

FIG. 15 is an explanatory diagram showing an example of recorded information for each management domain during a number assignment process.

FIG. 16 is an explanatory diagram showing an example of communication content to be transmitted and received between cooperation units in the process of number assignment.

FIG. 19 is an explanatory diagram showing an example of recorded information for each management domain during the process of division into strongly connected components.

FIG. 20 is an explanatory diagram showing an example of communication content to be transmitted and received between the cooperation units in the process of division into strongly connected components.

FIG. 24 is an explanatory diagram showing an example of communication content to be transmitted and received between a cooperation unit and a combining unit.

FIG. 30 is an explanatory diagram showing an example of anonymous information for each management domain.

FIG. 31 is a block diagram showing a configuration example of a second exemplary embodiment of the planning system according to the present invention.

FIG. 41 is an explanatory diagram showing an example of communication content to be transmitted and received at the time of a request and at the time of a reply to start a compilation process.

FIG. 42 is an explanatory diagram showing an example of communication content to be transmitted and received at the time of a request and at the time of a reply to make a search for a management field.

FIG. 43 is an explanatory diagram showing an example of recorded information for each management domain during a search for a management field.

FIG. 44 is an explanatory diagram showing another example of recorded information for each management domain during a search for a management field.

FIG. 45 is an explanatory diagram showing an example of recorded information for each management domain after notification of information on a management field.

FIG. 46 is an explanatory diagram showing an example of communication content to be transmitted and received at the time of a request and at the time of a reply to gather relationships.

FIG. 47 is an explanatory diagram showing an example of recorded information in which relationships have been compiled for each management domain.

FIG. 48 is an explanatory diagram showing another example of communication content to be transmitted and received at the time of a request and at the time of a reply to make a search for a management field.

FIG. 49 is an explanatory diagram showing another example of communication content to be transmitted and received at the time of a request and at the time of a reply to gather relationships.

FIG. 50 is an explanatory diagram showing another example of communication content to be transmitted and received between the cooperation unit and the combining unit.

FIG. 51 is a block diagram showing an outline of a cooperative planning system according to the present invention.

DESCRIPTION OF EMBODIMENTS

First Exemplary Embodiment

[Description of Configuration]

Figure 1:
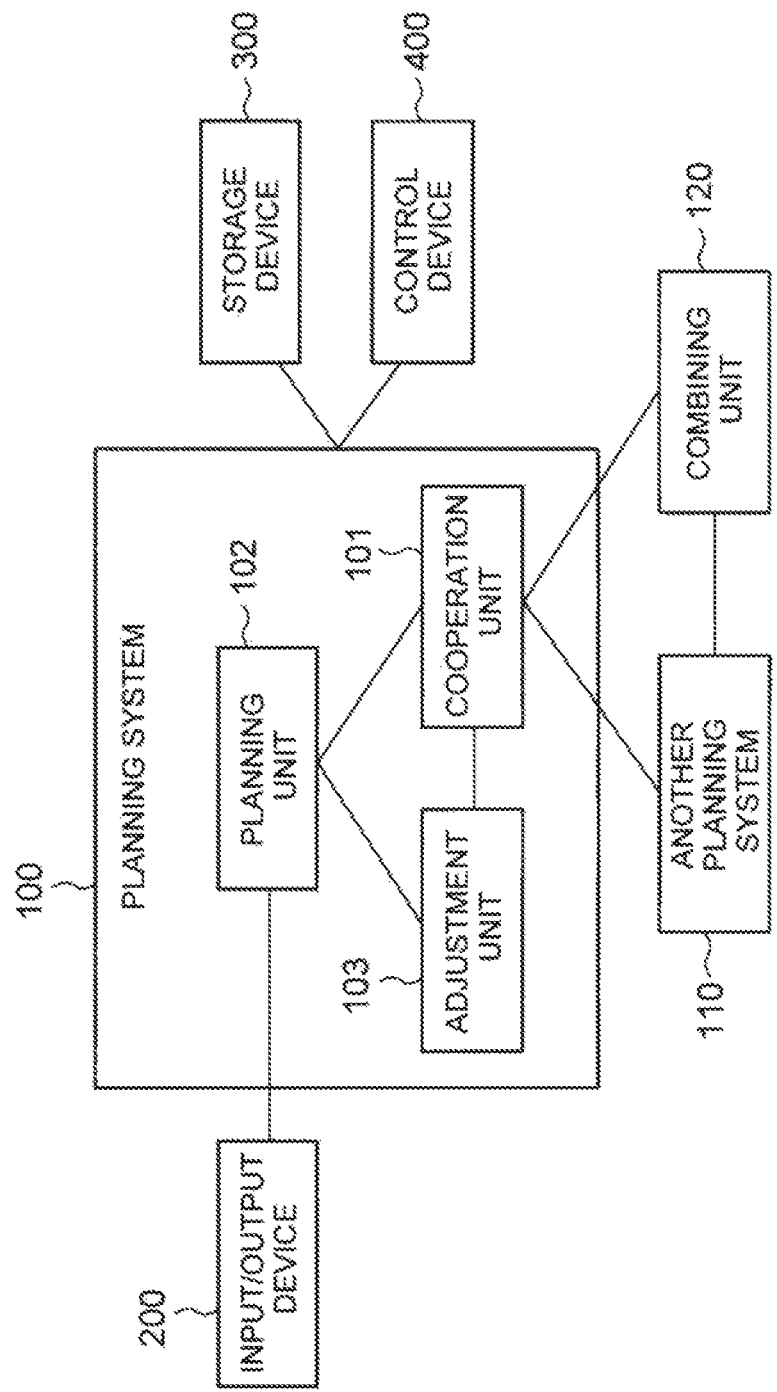
FIG. 1 is a block diagram showing a configuration example of a first exemplary embodiment of a planning system according to the present invention.

Exemplary embodiments of the present invention will be described below with reference to the drawings. FIG. 1 is a block diagram showing a configuration example of a first exemplary embodiment of a planning system according to the present invention. As shown in FIG. 1, a planning system 100 according to the present exemplary embodiment includes a cooperation unit 101, a planning unit 102, and an adjustment unit 103.

As shown in FIG. 1, the cooperation unit 101 is communicably connected to the planning unit 102 and the adjustment unit 103 via a communication network or the like. Furthermore, the planning unit 102 is communicably connected to the adjustment unit 103 and an input/output device 200 external to the planning system 100 via a communication network or the like.

Moreover, as shown in FIG. 1, the cooperation unit 101 is communicably connected to another planning system 110 and a combining unit 120 external to the planning system 100 via a communication network or the like. In addition, the another planning system 110 is communicably connected to the same combining unit 120, to which the cooperation unit 101 is communicably connected, via a communication network or the like. Furthermore, each constituent element of the planning system 100 is communicably connected to a storage device 300 and a control device 400 via a communication network or the like.

The cooperation unit 101 has a function of performing operation cooperatively with elements external to the planning system 100. On the basis of a request from the planning unit 102 and the adjustment unit 103, the cooperation unit 101 performs operation cooperatively with any another planning system 110, with which the cooperation unit 101 can communicate, and the combining unit 120.

The planning unit 102 has a function of generating a procedure for changing a system configuration. The planning unit 102 accepts a request to change a system configuration, input by a user, and generates a procedure for changing the system configuration that enables the requested system configuration change to be implemented. Furthermore, the planning unit 102 returns the generated change procedure to the user.

The adjustment unit 103 has a function of adjusting a system configuration definition. The adjustment unit 103 adjusts a system configuration definition read from the storage device 300, and inputs the adjusted system configuration definition to the planning unit 102.

The storage device 300 stores a system configuration definition managed by the planning system 100. Furthermore, a storage area for recording information is generated in the storage device 300. Note that a location where the storage area is generated is not limited to the storage device 300.

The control device 400 has a function of performing a process of changing the system configuration according to the procedure for changing the system configuration generated by the planning unit 102.

Figure 2:
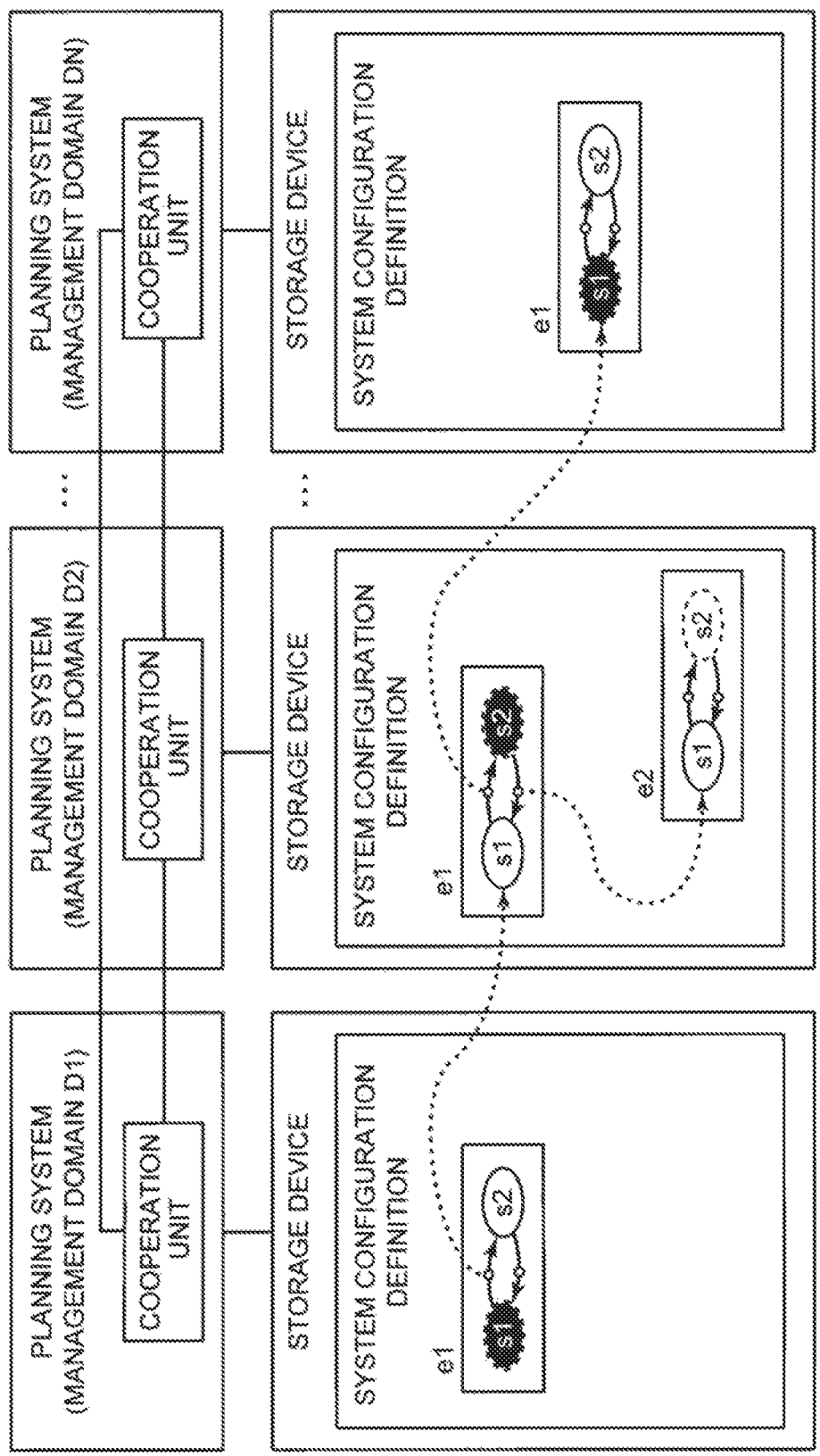
FIG. 2 is an explanatory diagram showing a configuration example of a system including a plurality of planning systems.

An example of a system including a plurality of the planning systems 100 shown in FIG. 1 is shown in FIG. 2. FIG. 2 is an explanatory diagram showing a configuration example of a system including a plurality of planning systems.

Each planning system is communicably connected to another planning system via each combining unit (not shown). Furthermore, the storage device 300 of each planning system stores a system configuration definition.

A system configuration definition managed by a planning system shown in FIG. 2 is related to a system configuration definition managed by another planning system. Specifically, an arrowed broken line shown in FIG. 2 represents a relationship between system configuration definitions. Hereinafter, a range of the system configuration definition managed by the planning system is referred to as a management domain of the planning system.

The system configuration definition according to the present exemplary embodiment is represented as a set of constituent elements referred to as state elements. The state element includes each of information indicating its own possible state and information indicating a feasible state transition. In addition, the state element includes each of information indicating its own current state, information indicating its own target state, and information indicating a relationship with another state element, as appropriate.

A solid-line rectangle in the system configuration definition shown in FIG. 2 represents a state element. Characters at the upper left of the rectangle represent a name of the state element. In addition, an ellipse in a state element represents a possible state of the state element. Characters in the ellipse represent a name of the state. In addition, an arrowed line between the states represents a state transition. Furthermore, a dashed-line ellipse and a black ellipse represent a current state and a target state, respectively. Moreover, an arrowed broken line connecting the state transition and a state in another state element represents a relationship with the another state element.

FIG. 3 is an explanatory diagram showing an example of a system configuration definition. The system configuration definition shown in FIG. 3 is a system configuration definition in a management domain D2 shown in FIG. 2.

In the example shown in FIG. 3, information is represented by use of the JavaScript (registered trademark) object notation (JSON) format. Hereinafter, in the present specification, the JSON format is used as a representation format when information is represented in text format. Note that the system configuration definition may be represented in a representation format other than the JSON format.

State elements "e1" and "e2" have been described in FIG. 3. As shown in FIG. 3, the state element "e1" has possible states "s1" and "s2." Furthermore, the state element "e1" has each of a "transition from s1 to s2" ("s1→s2" shown in FIG. 3) and a "transition from s2 to s1" ("s2→s1" shown in FIG. 3), which is a transition in a reverse direction, as feasible state transitions.

Moreover, as shown in FIG. 3, the current state and the target state of the state element "e1" are both the state "s2." In addition, the state element "e1" has two prior state constraints as information indicating relationships with other state elements.

The prior state constraint of the present exemplary embodiment is an example of information indicating a relationship between system configuration definitions. The prior state constraint is a constraint to the effect that another state element needs to be in a predetermined state in order for a state transition to be performed. In the case where, for example, there is a service provided by a virtual machine (VM), when the prior state constraint is used, there is represented a relationship to the effect that the VM needs to be in an "operating state" so as to cause the state of the service to make a transition to the "operating state."

In the case where the current state differs from the target state with respect to one or more state elements, a method described in PTL 2 enables generation of a procedure for changing a system configuration that causes the states of all state elements to make a transition from the current states to the target states while satisfying a prior state constraint. In the above example of the VM and the service, there is generated a procedure for changing a system configuration to be executed in sequence, in which the VM is started first, and subsequently, the service is started.

Furthermore, the system configuration definition of the present exemplary embodiment also specifies a relationship with a state element included in a system configuration definition in another management domain. In the example shown in FIG. 3, the state transition "s1→s2" of the state element "e1" specifies a prior state constraint on the state "s1" of the state element "e1" in a management domain DN. In addition, the state transition "s2→s1" of the state element "e1" specifies a prior state constraint on the state "s1" of the state element "e2" in the same management domain D2.

Note that a state element in another management domain may be represented in association with an id indicating a management domain, as "DN::e1" shown in FIG. 3. Hereinafter, in the present specification, there is used a description method in which information in a management domain and an id indicating the management domain are put together with "::" interposed therebetween, in the case of representing the information in the management domain.

Note that for convenience of operation, information indicating a relationship between the system configuration definitions of the present exemplary embodiment is held in both state elements in each system configuration definition. For example, the prior state constraint specified is recorded as an "imposed prior state constraint" as shown in FIG. 3 in a state element on which the prior state constraint has been specified.

FIG. 4 is an explanatory diagram showing an example of a request to change a system configuration. As shown in FIG. 4, a new target state of a state element in a management domain is specified in a request to change a system configuration, accepted in the management domain.

For example, consider the case where details of the system configuration definition at a predetermined point in time is as shown in FIG. 2, and the request to change a system configuration, shown in FIG. 4, is accepted in a management domain D1. As shown in FIG. 2, the current state of the state element "D1::e1" is the state "s1." It is specified that the target state is the state "s2" in the request to change a system configuration, shown in FIG. 4. Thus, the state element "D1::e1" is required to make a transition to the state "s2."

Referring to FIG. 3, the state element "D1::e1" makes a transition to the state "s2," on the condition that the prior state constraint is satisfied. Specifically, a state element "D2::e1" is required to make a transition to the state "s1." Furthermore, in order for the state element "D2::e1" to make a transition to the state "s1," a state element "D2::e2" is required to make a transition to the state "s1."

In addition, since the target state of the state element "D2::e1" is the state "s2" as shown in FIG. 2, the state element "D2::e1" is required to make a transition to the state "s2" again after making a transition to the state "s1." Note that since no target state is specified for the state element "D2::e2," the state element "D2::e2" need not make a transition to another state after making a transition to the state "s1."

Note that referring to FIG. 3, a prior state constraint on the state "s1" of the state element "DN::e1" is specified by the state element "D2::e1." However, since the current state of the state element "DN::e1" is the state "s1" as shown in FIG. 2, it is considered that the state element "DN::e1" is not affected by the prior state constraint in terms of the change request shown in FIG. 4.

Figure 5:
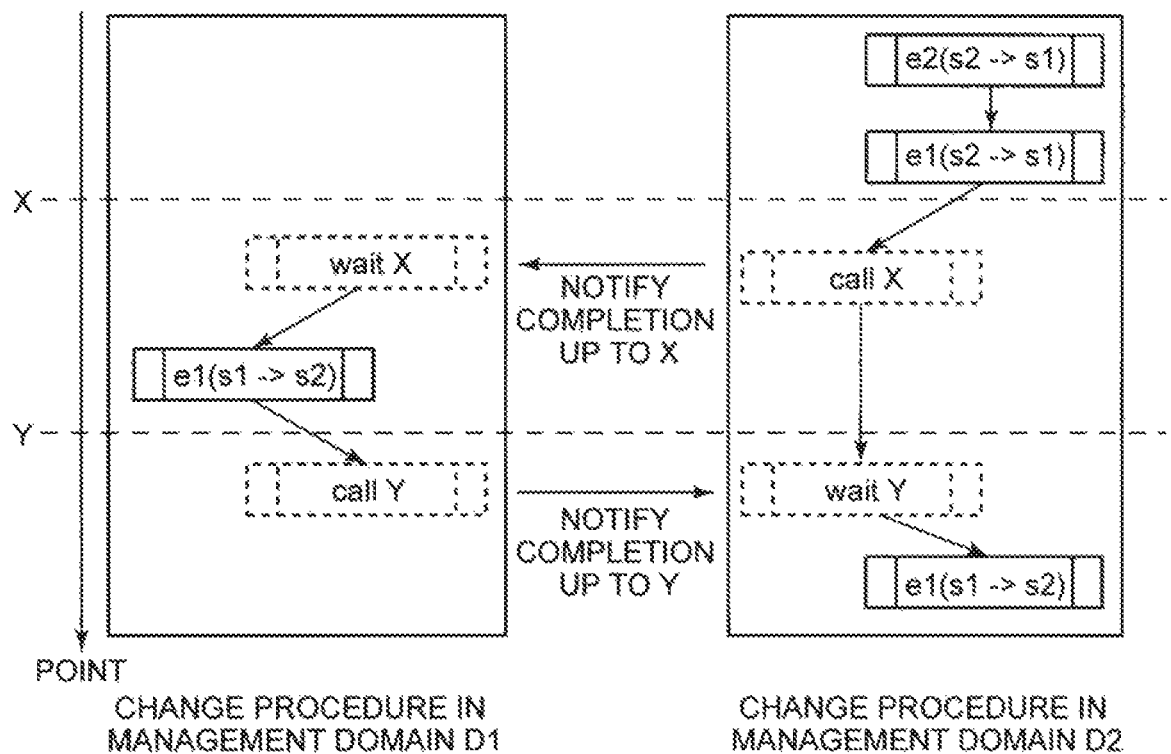
FIG. 5 is an explanatory diagram showing an example of a procedure for changing a system configuration, to be generated in the first exemplary embodiment.

For example, in the present exemplary embodiment, there is generated a procedure for changing a system configuration, shown in FIG. 5. FIG. 5 is an explanatory diagram showing an example of a procedure for changing a system configuration, to be generated in the first exemplary embodiment.

The procedure for changing a system configuration, shown in FIG. 5, includes a change procedure in the management domain D1, and a change procedure in the management domain D2. That is, the change procedure to be generated in the present exemplary embodiment is represented separately for each management domain.

Furthermore, a step for starting work when a management domain on which the work is to be performed is changed, is added to the change procedure to be generated in the present exemplary embodiment. "call X" shown in FIG. 5 is a step of notifying a planning system in the management domain D1 that work has been completed up to a point "X" in a series of work. After the work is completed up to the point "X," "call X" is executed. "call Y" shown in FIG. 5 is also a step similar to "call X."

Furthermore, "wait X" shown in FIG. 5 is a step in which the planning system in the management domain D1 waits for the notification of completion of the work up to the point "X." After "wait X" is executed, subsequent work is performed after the point "X." "wait Y" shown in FIG. 5 is also a step similar to "wait X."

That is, FIG. 5 shows a series of steps as follows. First, the state element "D2::e2" is caused to make a transition from the state "s2" to the state "s1." Next, the state element "D2::e1" is caused to make a transition from the state "s2" to the state "s1." Then, the state element "D1::e1" is caused to make a transition from the state "s1" to the state "s2." Finally, the state element "D1::e1" is caused to make a transition again from the state "s1" to the state "s2."

If procedures for changing a system configuration as shown in FIG. 5 are prepared in respective management domains, a series of work of changing the system configuration is performed, with consistency as a whole, by each planning system executing the procedure for changing the system configuration for which the planning system is responsible.

The procedure for changing a system configuration shown in FIG. 5 is generated on the basis of a concept to be described below. Assume, for example, two different management domains DA and DB, a system SA managed in the management domain DA, and a system SB managed in the management domain DB. The system SA has a dependency relationship with the system SB.

Consider the case where the system SB is affected by a request to change a system configuration, made to the system SA. In the above case, it is considered that a change procedure PA for changing the system configuration regarding the system SA just needs to be generated only in the management domain DA. Similarly, it is considered that a change procedure PB for changing a system configuration regarding the system SB just needs to be generated only in the management domain DB.

Furthermore, it is considered that all the work just needs to be completed by the system SA and the system SB cooperatively operating after details of the change procedures are approved in respective management domains. In the present exemplary embodiment, a procedure for changing a system configuration is generated on the basis of the above concept.

Note that when generating a procedure for changing a system configuration, the planning system 100 according to the present exemplary embodiment does not involve an exchange of state elements themselves between management domains. In the case of executing a procedure search process that requires a group of state elements to be gathered together in one place, the planning system 100 uses the combining unit 120 external to the planning system 100. This is to minimize details of state elements to be disclosed to the another planning system 110.

Furthermore, in order to minimize the number of groups of state elements to be gathered in the combining unit 120, the planning system 100 performs preprocessing such as division into groups.

[Description of Operation]

Figure 6:
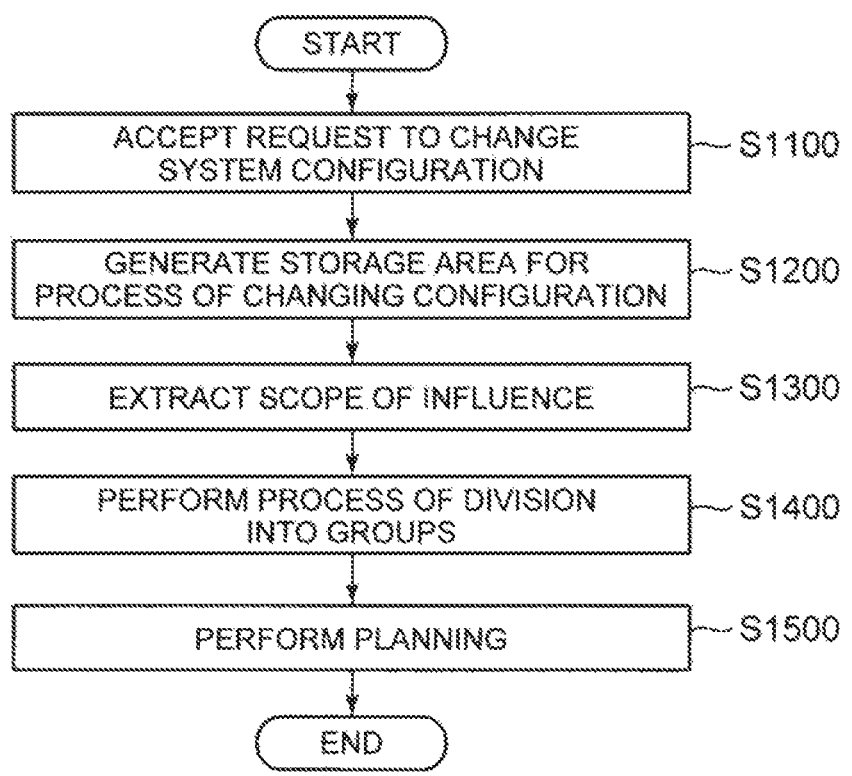
FIG. 6 is a flowchart showing the overall operation of a process of generating a change procedure, to be performed by a planning system 100 according to the first exemplary embodiment.

Operation of the planning system 100 according to the present exemplary embodiment will be described below with reference to FIGS. 6, 9, 12, and 22. FIG. 6 is a flowchart showing the overall operation of a process of generating a change procedure, to be performed by the planning system 100 according to the first exemplary embodiment.

System configuration definitions in a plurality of management domains are to be processed in a process of generating a change procedure, to be performed by the planning system 100 according to the present exemplary embodiment. The planning system 100 proceeds with a process in cooperation with a group of planning systems in other management domains.

The planning unit 102 accepts a request to change a system configuration from a user via the input/output device 200. After accepting the request, the planning unit 102 generates a change request id for uniquely identifying the request to change the system configuration (step S1100).

Next, the planning unit 102 generates, in the storage device 300, a storage area for recording information concerning the accepted request to change the system configuration in association with the generated change request id (step S1200). The planning unit 102 records the information concerning the request to change the system configuration in the generated storage area, in association with the change request id.

Next, the planning unit 102 notifies the adjustment unit 103 of the change request id generated in step S1100. Hereinafter, the information concerning the request to change the system configuration is constantly recorded in the storage area, together with the change request id. When the information concerning the change request is referred to, the change request id serves as a key of reference.

After the notification of the change request id, the adjustment unit 103 reads a system configuration definition from the storage device 300. Next, the adjustment unit 103 extracts a scope of influence of the change request indicated by the notified change request id in the read system configuration definition (step S1300).

There is a possibility that the system configuration definition managed by each planning system may include a large number of groups of state elements. That is, there is a possibility that it may become difficult to perform procedure planning if the entire system configuration definition is to be taken into consideration. In the present exemplary embodiment, the adjustment unit 103 extracts the scope of influence, so that the change procedure is generated only on the basis of a part relating to the change of the system configuration.

For example, in the above example in which the planning system in the management domain D1 has accepted the request to change the system configuration shown in FIG. 4, the adjustment unit 103 determines that the state element "DN::e1" shown in FIG. 2 is out of the scope of influence, and does not include the state element "DN::e1" in the scope of influence.

Next, the adjustment unit 103 divides the scope of influence, extracted from the system configuration definition, into groups for each of which the procedure search process is collectively performed by the planning unit 102 (step S1400). The adjustment unit 103 inputs a plurality of the generated groups to the planning unit 102.

The procedure search process has a problem that a processing load increases at an accelerated pace as the number of state elements to be processed at a time increases. Furthermore, in order to perform the procedure search process for system configuration definitions in a plurality of management domains, the system configuration definitions are required to be gathered together in one place. Therefore, it is important in terms of security to minimize the range of system configuration definitions to be gathered.

The following method can be cited as a specific example of a method of division. As with the method described in PTL 3, a graph is divided into strongly connected components on the assumption that a system configuration definition is regarded as the graph, with a state element in the system configuration definition as a node, and a relationship between the state elements as an edge.

Next, the planning unit 102 performs a procedure search process for all the input groups. The planning unit 102 generates the entire procedure for changing the system configuration by combining partial procedures generated as a result of performing the procedure search process (step S1500). Note that as shown in FIG. 6, the entire process of step S1500 is referred to as planning. After generating the procedure for changing the system configuration, the planning system 100 terminates the process of generating the change procedure.

Figure 7:
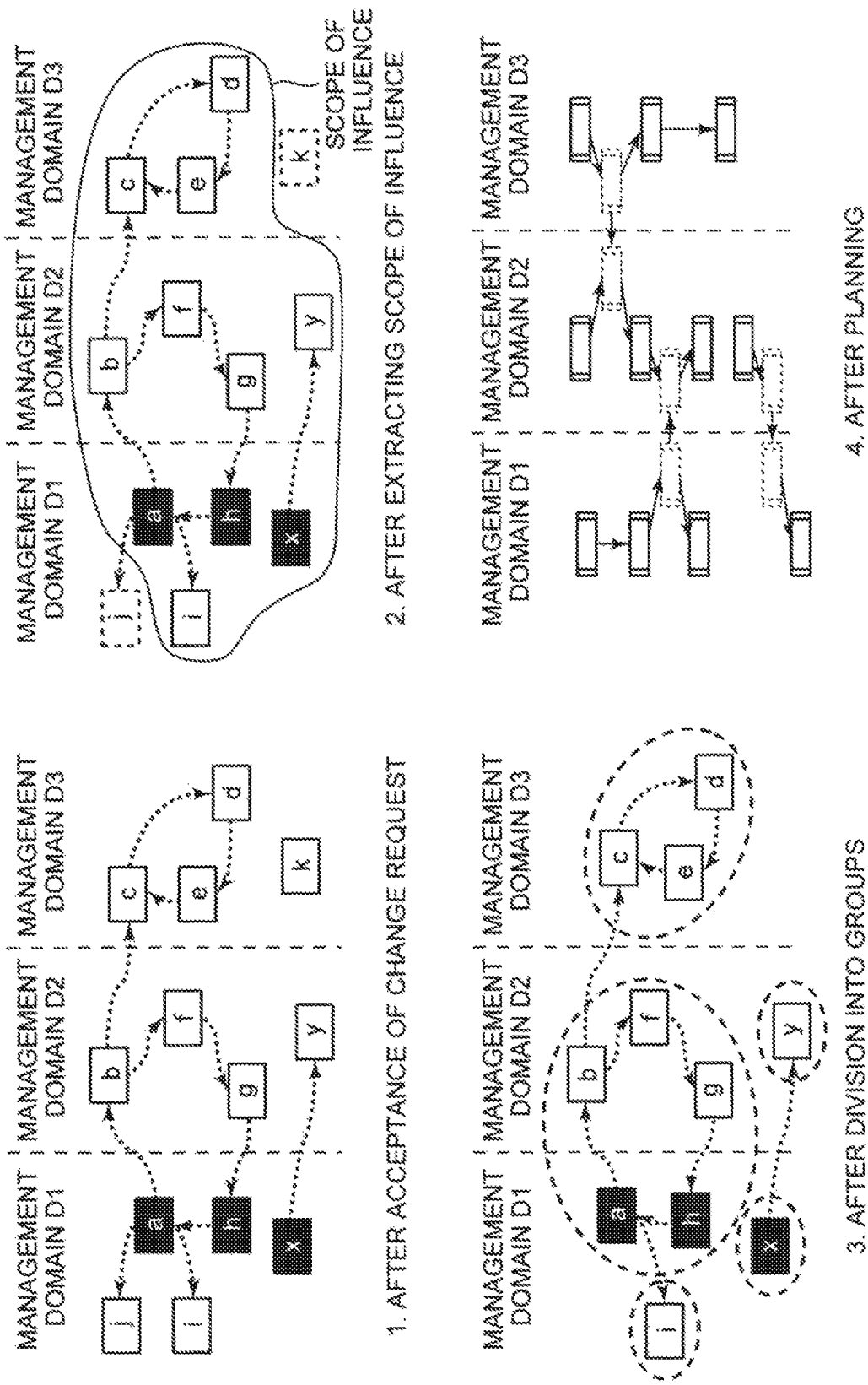
FIG. 7 is an explanatory diagram showing a specific example of the process of generating a change procedure, to be performed by the planning system 100 according to the first exemplary embodiment.

FIG. 7 is an explanatory diagram showing a specific example of the process of generating a change procedure, to be performed by the planning system 100 according to the first exemplary embodiment. In FIG. 7, a rectangle represents a state element, and an arrowed broken line represents a prior state constraint. A character in the rectangle represents a name of the state element.

Each of subprocesses included in the process of generating the change procedure is described below with reference to FIG. 7. The subprocesses include a process of extracting a scope of influence, in step S1300, a process of division into groups in step S1400, and planning in step S1500.

A general depth-first search process, which is frequently used in each subprocess, will be described so as to simplify the following description. The depth-first search process is one of processes of finding all nodes that can be reached from a single node as a starting point when the single node is specified in a given graph including nodes and edges. In the depth-first search process, a search is preferentially made for another node that can be further reached from a newly found reachable node.

Figure 8:
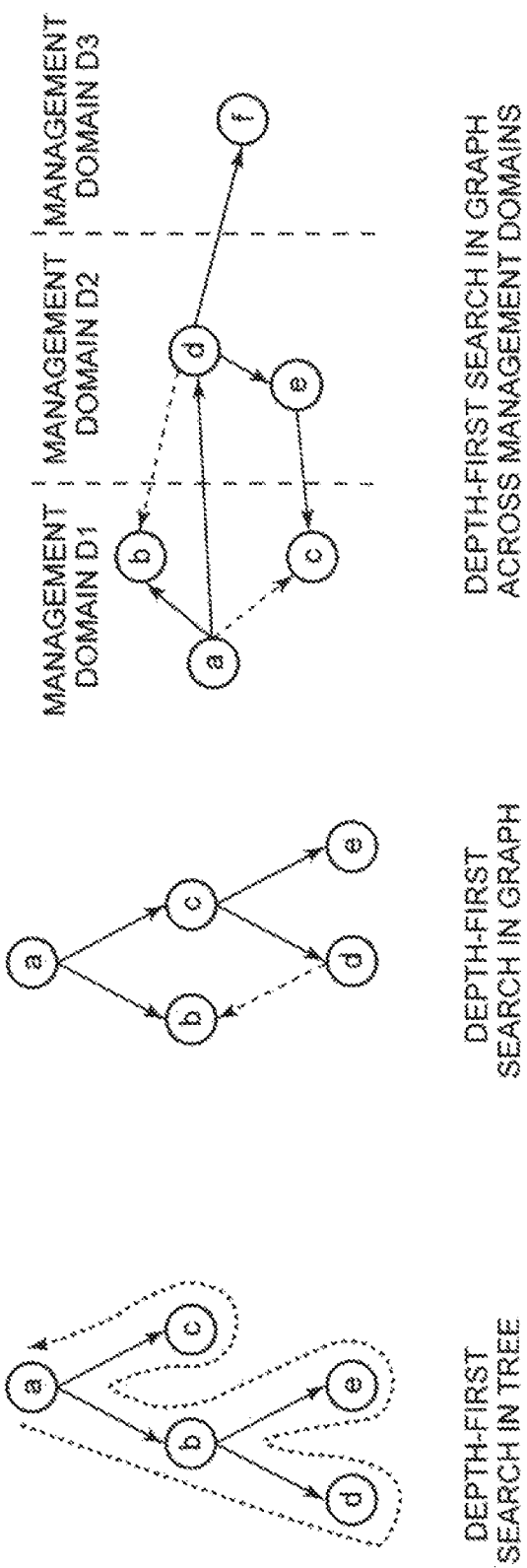
FIG. 8 is an explanatory diagram showing an example of a depth-first search process.

FIG. 8 is an explanatory diagram showing an example of the depth-first search process. A circle shown in FIG. 8 represents a node. A character in the circle represents a name of the node. In addition, an arrowed line connecting the nodes shown in FIG. 8 represents an edge.

FIG. 8 shows a depth-first search process in a tree at the left. When the tree and a node "a" shown in FIG. 8 are specified, a node "b" that can be reached from the node "a" is found first in the depth-first search process. Next, a node "d" that can be further reached from the node "b" is found.

As shown in the tree of FIG. 8, there is no node that can be further reached from the node "d." Thus, a node "e," which is another node that can be reached from the node "b," is found after the node "d" is found. There is no node that can be further reached from the node "e," and there remains no other node that can be reached from the node "b." Thus, a node "c," which is another node that can be reached from the node "a," is finally found after the node "e" is found.

An arrowed broken line shown in the tree of FIG. 8 represents a locus of the basic depth-first search described above. Note that the depth-first search process may also deal with a general graph other than a tree as shown in FIG. 8. However, since a node once found is not included in nodes to be searched for, a tree is constantly constructed in the depth-first search process when only a search result is focused on.

FIG. 8 shows a depth-first search process in a graph at the center. In the graph at the center shown in FIG. 8, a node "b" has already been found. Thus, even if an attempt is made to search for the node "b" next to a node "d," no search is made for the node "b" accordingly.

In the case where the depth-first search process is performed across a plurality of management domains, a search id is generated for uniquely identifying a search operation at the start of a search. When a node is found, it is confirmed whether the node has already been found in a search operation indicated by the generated search id.

When an edge across management domains is followed, a planning system in a management domain, as a search source, just needs to notify a planning system in a management domain, as a search destination, from which node toward which node a search proceeds under the search id.

Furthermore, when the edge across the management domains is followed in the reverse direction, the planning system in the management domain, as the search destination, just needs to notify the planning system in the management domain, as the search source, from which node toward which node the search is returned under the search id.

Moreover, assume that when a search is about to proceed from a node in a management domain toward a node in another management domain, a search has already been made for the node in the search destination. In such a case, a planning system in the management domain as the search destination just needs to simply reply that a search has been made for the node.

FIG. 8 shows a depth-first search process in a graph across management domains at the right. In the case where, for example, after a search is made for nodes "a," "b," and "d," a search is about to proceed from the node "d" toward the node "b" in an example shown in the right of FIG. 8, a planning system in the management domain D2 requests the planning system in the management domain D1 to make a search.

The planning system in the management domain D1, which has been requested to make a search, makes a reply to the planning system in the management domain D2 to the effect that a search has been made for the node "b." The planning system in the management domain D2, which has received the reply, just needs to further proceed a search for a node "f."

In the following description of subprocesses, even in the case where the depth-first search is used, description of the above-described basic operation will be omitted. In the description of the subprocesses, details of the depth-first search process are set forth by description of parts according to the type of process.

The parts according to the type of process include, for example, an object to be regarded as a node and an object to be regarded as an edge. In addition, the parts according to the type of process also include a process to be performed when a node is found first, and a process to be performed when all other nodes for which a search can be made from a node are found and the search is returned.

Furthermore, the parts according to the type of process also include, for example, communication content to be transmitted and received between planning systems in management domains when a search proceeds across the management domains, and a process to be performed before/after the transmission and reception.

First, the process of extracting a scope of influence in step S1300 will be described with reference to FIG. 9. FIG. 9 is a flowchart showing the operation of a process of extracting a scope of influence, to be performed by the adjustment unit 103 according to the first exemplary embodiment.

In the process of extracting a scope of influence, the adjustment unit 103 starts from a state element requiring a change, and finds a state element that is incidentally changed according to a relationship with the state element, and all state elements that are changed as a chain of events caused by the state element incidentally changed.

In order to find all state elements to be changed, the adjustment unit 103 performs the process of extracting a scope of influence shown in FIG. 9. The adjustment unit 103, in a management domain in which a request to change a system configuration has been accepted, regards, as a state element requiring a change, a state element with a specified target state which is different from a current state recorded in the storage device 300, among state elements with target states which are specified by the request to change the system configuration (step S1310). Next, the adjustment unit 103 records that the state element requiring a change is included in the scope of influence.

Next, the adjustment unit 103 makes a search for other state elements to be affected by the changes of the state elements found in step S1310. The adjustment unit 103 confirms whether there remains any state element for which the search for another state element to be affected by the change has not been performed, among the state elements found in step S1310 (step S1320).

When there remains no state element for which the search has not been performed (Yes in step S1320), the adjustment unit 103 terminates the process of extracting a scope of influence.

When there remain state elements for which the search has not been performed (No in step S1320), the adjustment unit 103 picks out one of the state elements for which the search has not been performed. Next, the adjustment unit 103 performs a depth-first search process with the state element picked out as a starting point. Consequently, the adjustment unit 103 finds another state element to be affected by the change (step S1330).

In the depth-first search process performed in step S1330, a state element is regarded as a node. In addition, in the case where there is a possibility that a relationship that a state element as a node has, may affect another state element, the relationship is regarded as an edge.

If the relationship that the state element has is a prior state constraint, it is determined that there is a possibility that the relationship may have an influence in the case where the state of a specified state element is different from the current state of the state element. This is because the prior state constraint, as described above, specifies that a state element specified so as to make a state transition is required to make a transition to a state different from the current state.

In addition, when a node is found in the depth-first search process performed in step S1330, the adjustment unit 103 adds a state element corresponding to the found node to the scope of influence in a management domain in which the node exists. After terminating the depth-first search process, the adjustment unit 103 performs the process of step S1320 again.

For example, consider a process of extracting a scope of influence from the system configuration definition shown in the upper left of FIG. 7. Assume that after the planning system 100 in the management domain D1 accepts a request to change a system configuration, changes of a state element "a," a state element "h," and a state element "x" are determined. Note that a black state element shown in FIG. 7 represents a state element the change of which has been determined.

The adjustment unit 103 performs a depth-first search process with the state element "a" as a starting point. As a result, the adjustment unit 103 finds, for example, the state elements "a," "b," "c," "d," "e," "f," "g," "h," and "i" as state elements to be affected by the change. At the stage where the depth-first search process has been performed, there remains the state element "x" for which a search has not been made.

Next, the adjustment unit 103 performs a depth-first search process with the state element "x" as a starting point. As a result, the adjustment unit 103 finds the state elements "x" and "y" as state elements to be affected by the change. At the stage where the second round of the depth-first search process has been performed, there remains no state element for which a search has not been made. Thus, the adjustment unit 103 terminates the process of extracting a scope of influence. A solid-line frame shown in the upper right of FIG. 7 represents a scope of influence finally extracted.

FIG. 10 is an explanatory diagram showing an example of recorded information for each management domain during the process of extracting a scope of influence. FIG. 10 shows an example of recorded information on a scope of influence in the management domain D2. As shown in FIG. 10, the state elements "b," "f," "g," and "y" have been recorded as state elements included in the scope of influence. The state elements included in the scope of influence just need to be recorded in respective management domains in which the state elements exist.

Next, a process of division into groups in step S1400 will be described. As described above, in the process of division into groups, a system configuration definition is regarded as a graph, with a state element in the system configuration definition as a node, and a relationship between the state elements as an edge. In the process of division into groups, the adjustment unit 103 divides the graph into a plurality of strongly connected components.

There is a plurality of methods for division into strongly connected components. An example of a process using one of the plurality of methods is shown in the present exemplary embodiment. Described below is a method for division into strongly connected components, to be used in the present exemplary embodiment. Note that the method for division into strongly connected components, to be used in the present exemplary embodiment, is not limited to the method set forth below.

FIG. 11 is an explanatory diagram showing an example of a process of division into strongly connected components. A circle shown in FIG. 11 represents a node. A character in the circle represents a name of the node. In addition, an arrowed line connecting the nodes shown in FIG. 11 represents an edge. According to a method shown in FIG. 11, a depth-first search process is performed twice to divide an entire graph into a plurality of strongly connected components.

In a first round of the depth-first search process, a search is made from an appropriate node. Then, numbers are assigned to nodes in descending order of depth of a search step from the node where the search has been started. For example, assume that a graph shown in the upper left of FIG. 11 is given, and a node "a" is selected as a node where a search is started.

After nodes are followed in the order of "a," "b," "d," "e," and "f" in the first round of the depth-first search process, no node is found beyond the node "f." Therefore, a number "1" is assigned to the node "f." Next, a number "2" is assigned to a node "g" since no node is found beyond the node "g."

Then, after the search is returned to the node "e," a number "3" is assigned to the node "e" since no node other than the nodes "f" and "g" is newly found beyond the node "e." Subsequently, as the process proceeds in a similar manner, a number is assigned to each node as shown in the upper right of FIG. 11. A number shown near a node shown in FIG. 11 represents the number assigned to the node. Note that an arrowed broken line shown in the upper right of FIG. 11 represents a locus of a search.

Next, in a second round of the depth-first search process, a search is started from a node to which the largest number has been assigned, after directions of the edges are reversed. A group of nodes that can be reached when a search is made forms a single strongly connected component.

For example, when a search is started from the node "a," to which the largest number "7" has been assigned, the adjustment unit 103 understands that the three nodes "a," "c," and "b" are nodes that can be reached from the node "a" while paying attention to the fact that the directions of the edges have been reversed. That is, as shown in the under left of FIG. 11, a group of the nodes "a," "c," and "b" forms a strongly connected component. A dashed-line ellipse shown in FIG. 11 represents a strongly connected component.

Subsequently, a search is started again from the node "d," to which a number "4," that is, the current largest number has been assigned, after excluding the nodes judged to be nodes forming a strongly connected component. Then, the adjustment unit 103 understands that the two nodes "d" and "e" are nodes that can be reached from the node "d." That is, as shown in the under right of FIG. 11, a group of the nodes "d" and "e" forms a strongly connected component. Similarly, there are found a strongly connected component formed only of the node "f" and a strongly connected component formed only of the node "g."

Figure 12:
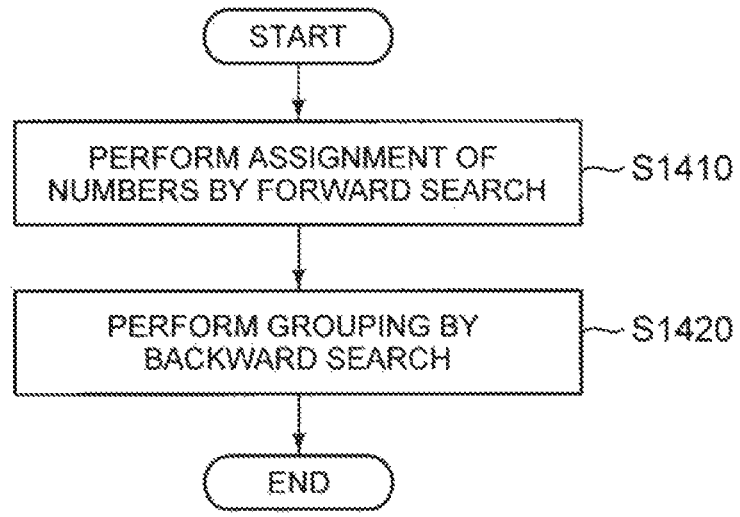
FIG. 12 is a flowchart showing the overall operation of a process of division into groups, to be performed by the adjustment unit 103 according to the first exemplary embodiment.

In the process of division into groups in step S1400, the planning systems in a plurality of the management domains cooperatively perform a process of division into strongly connected components as described above. Operation of the process of division into groups in step S1400 will be described below. FIG. 12 is a flowchart showing the overall operation of a process of division into groups, to be performed by the adjustment unit 103 according to the first exemplary embodiment.

The adjustment unit 103 first performs a forward depth-first search process to assign a number to each state element (step S1410). Next, the adjustment unit 103 performs a backward depth-first search process to divide a group of state elements into a plurality of strongly connected components (step S1420). After the division into the plurality of strongly connected components, the adjustment unit 103 terminates the process of division into groups.

Figure 13:
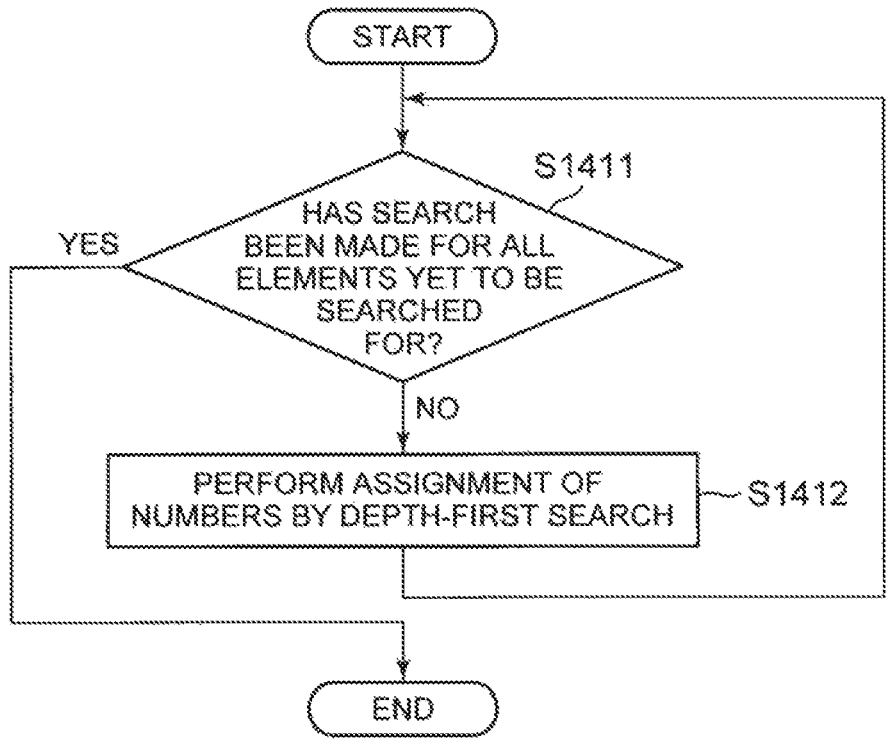
FIG. 13 is a flowchart showing the operation of a forward depth-first search process to be performed by the adjustment unit 103 according to the first exemplary embodiment.

Subprocesses included in the process of division into groups will be described below. First, the forward depth-first search process in step S1410 will be described. FIG. 13 is a flowchart showing the operation of a forward depth-first search process to be performed by the adjustment unit 103 according to the first exemplary embodiment. A process shown in FIG. 13 is a process of assigning numbers to be used for division into groups.

The adjustment unit 103 confirms whether there remains any state element for which a search has not been made so that numbers are assigned to all the state elements (step S1411). When there remains no state element for which a search has not been made (Yes in step S1411), the adjustment unit 103 terminates the forward depth-first search process.

When there remain state elements for which a search has not been made (No in step S1411), the adjustment unit 103 picks out one of the state elements for which a search has not been made. Next, the adjustment unit 103 performs a depth-first search process, with the state element picked out as a starting point, to assign a number to each state element (step S1412).

In the depth-first search process in step S1412, a state element is regarded as a node, and a relationship between state elements is regarded as an edge. Furthermore, after a search for each state element is completed, the adjustment unit 103 not only assigns numbers to the state elements for which a search has been made, but also records the largest number in a management domain. After terminating the depth-first search process, the adjustment unit 103 performs the process of step S1411 again.

For example, in the case where the adjustment unit 103 performs a depth-first search process with the state element "a" as a starting point, with respect to a system configuration definition in the solid-line frame shown in the upper right of FIG. 7, a number is assigned to each state element as shown in FIG. 14.

FIG. 14 is an explanatory diagram showing an example of state elements to which numbers to be used for division into groups have been assigned. For example, the state element "a" is represented as "a:9." This indicates that a number "9" has been assigned to the state element "a." In addition, a state element represented as a double-line frame is a state element as a starting point of the depth-first search process.

FIG. 15 is an explanatory diagram showing an example of recorded information for each management domain during a number assignment process. FIG. 15 shows an example of information concerning number assignment recorded in the management domain D2. When the process of step S1410 is completed, information as shown in FIG. 15 is recorded. As shown in FIG. 15, numbers assigned to the state elements "b," "f," and "g" have been recorded. In addition, a number "6," which is the largest number in the management domain D2, and the state element "g," to which the largest number has been assigned, have been recorded.

FIG. 16 is an explanatory diagram showing an example of communication content to be transmitted and received between cooperation units in the process of number assignment. FIG. 16 shows a request message to be transmitted from the planning system in the management domain D2 when a search proceeds from a state element "D2::g" toward a state element "D1::h."

Furthermore, FIG. 16 shows a reply message to be transmitted from the planning system in the management domain D1, in response to the request message shown in FIG. 16. When a search is performed across management domains, the current largest number of each management domain is notified to both management domains, so that consecutive numbers as a whole are assigned.

Figure 17:
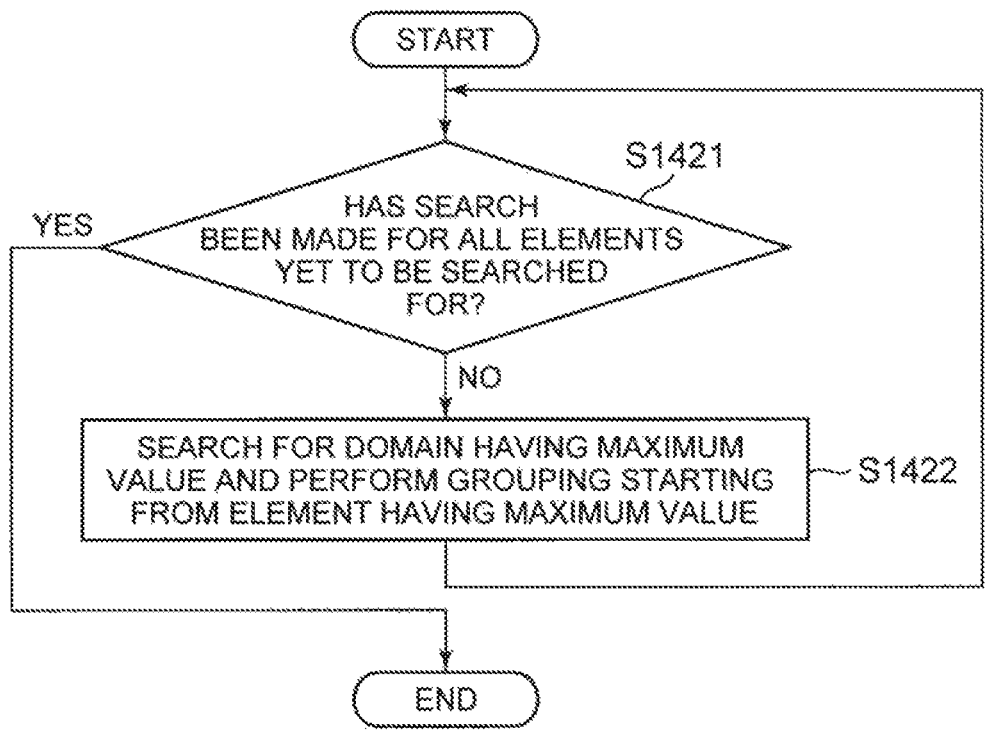
FIG. 17 is a flowchart showing the operation of a backward depth-first search process to be performed by the adjustment unit 103 according to the first exemplary embodiment.

Next, the backward depth-first search process in step S1420 will be described. FIG. 17 is a flowchart showing the operation of a backward depth-first search process to be performed by the adjustment unit 103 according to the first exemplary embodiment. The process shown in FIG. 17 is a process of dividing a group of state elements into a plurality of strongly connected components, as division into groups.

In order to divide the group of state elements into the plurality of strongly connected components, the adjustment unit 103 confirms whether there remains any state element for which a search has not been made (step S1421). When there remains no state element for which a search has not been made (Yes in step S1421), the adjustment unit 103 terminates the backward depth-first search process.

When there remain state elements for which a search has not been made (No in step S1421), the adjustment unit 103 performs a backward depth-first search process, starting from a state element to which the largest number has been assigned, among the state elements for which a search has not been made. As a result, the adjustment unit 103 extracts a strongly connected component (step S1422).

In steps S1421 and S1422, the adjustment unit 103 finds the state elements for which a search has not been made and the state element to which the largest number has been assigned, from the whole of a plurality of related management domains. In order to perform the above process, the planning system in each management domain may manage information on a related management domain in terms of the relationship between system configuration definitions.

For example, the planning system in the management domain D1 may manage information on the management domain D2 as a related management domain. Furthermore, the planning system in the management domain D2 may manage information on the management domain D1 and a management domain D3 as related management domains. Moreover, a planning system in the management domain D3 may manage information on the management domain D2 as a related management domain.

For example, in the depth-first search process of step S1330, it is possible to obtain information to be managed by recording the management domain of the other party when a planning system finds a relationship with another management domain and transmits a search request, or when a search request is accepted from another management domain.

A state element indicated by the information on the related management domain forms a graph as a whole. Thus, there are found the state elements for which a search has not been made and the state element to which the largest number has been assigned while the planning system performs a depth-first search process on the graph.

In other words, the planning system in each management domain corresponding to a node returns information on the presence/absence of an identified state element for which a search has not been made, to the planning system as the search source. As a result, the presence/absence of a state element for which a search has not been made is understood as a whole. Furthermore, the planning system in each management domain corresponding to a node returns an identified largest number to the planning system as the search source. Thus, the number that is the largest of all is obtained.

In step S1422, a first depth-first search process is performed. As a result, there is found a state element to which the largest number has been assigned. Furthermore, in the first depth-first search process, a second depth-first search process for performing division into strongly connected components is performed as a process for each node.

In the depth-first search process in step S1422, a state element is regarded as a node, and an oppositely directed arrowed line representing a relationship between state elements is regarded as an edge. Moreover, the adjustment unit 103 generates a new group id in a management domain at the start of a search, and records the group id as information on the management domain.

When a node is found in the search, the adjustment unit 103 records a state element corresponding to the found node as a member of a group indicated by the generated group id. When the largest number in the management domain changes as a result of the recording, the adjustment unit 103 updates the largest number.

Furthermore, in the case where a search is made to another management domain, when a member in the another management domain newly joins a group, the adjustment unit 103 records the another management domain as a domain related to the group.

When requesting a search across management domains, the adjustment unit 103 notifies a planning system of the id of a group with respect to which a search for a member is in progress.

A planning system in a management domain that has received the request records a group indicated by the notified id as its own group. In addition, the planning system records a requesting management domain as a domain related to the recorded group, and continues the search. Moreover, the planning system records a found state element as a member of the recorded group.

Figure 18:
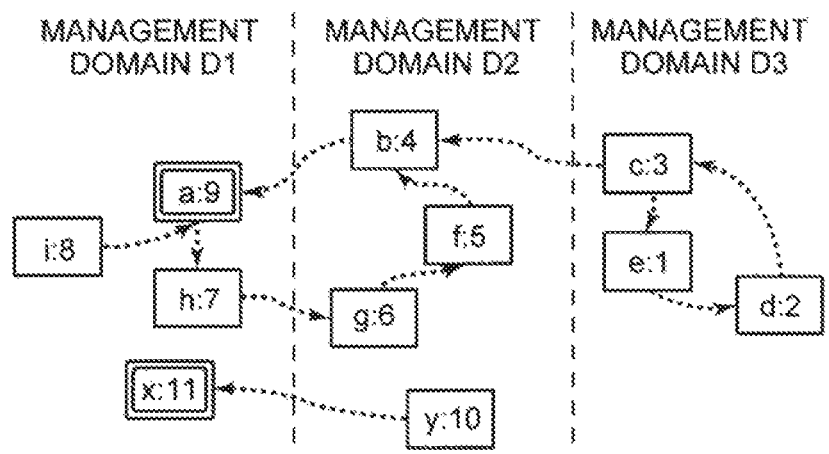
FIG. 18 is an explanatory diagram showing another example of state elements to which numbers to be used for division into groups have been assigned.

FIG. 18 is an explanatory diagram showing another example of state elements to which numbers to be used for division into groups have been assigned. The directions of arrowed lines connecting the state elements shown in FIG. 14 are opposite to the directions of arrowed lines connecting the state elements shown in FIG. 18. For example, when starting a depth-first search process with respect to a group of state elements shown in FIG. 18, with the state element "a" as a starting point, the adjustment unit 103 in the management domain D1 generates and records a new group id "D1::G1."

FIG. 19 shows an example of recorded information in a management domain, corresponding to the example shown in FIG. 18. FIG. 19 is an explanatory diagram showing an example of recorded information for each management domain during the process of division into strongly connected components. FIG. 19 shows recorded information at the time when a backward depth-first search process is performed. FIG. 19 shows recorded information in the management domain D1 at the left. In addition, FIG. 19 shows recorded information in the management domain D2 at the right.

Referring to the left of FIG. 19, as a result of searching for the state elements "a" and "h," the state element "a" and the state element "h" have been recorded as members of the group "D1::G1." Furthermore, the largest number of the management domain D1 has been updated such that a number "8" of the state element "i". In addition, the management domain D2 has been recorded as a domain related to the group "D1::G1."

Referring to the right of FIG. 19, as a result of searching for the state elements "b," "f," and "g," the state element "b," the state element "f," and the state element "g" have been recorded as members of the group "D1::G1." Furthermore, the largest number of the management domain D2 has been updated such that a number "10" of the state element "y". In addition, the management domain D1 has been recorded as a domain related to the group "D1::G1."

FIG. 20 is an explanatory diagram showing an example of communication content to be transmitted and received between the cooperation units in the process of division into strongly connected components. A request message shown in the left of FIG. 20 includes a group id. Furthermore, a reply message shown in the right of FIG. 20 includes a description to the effect that there further exists a new member to join the group.

Figure 21:
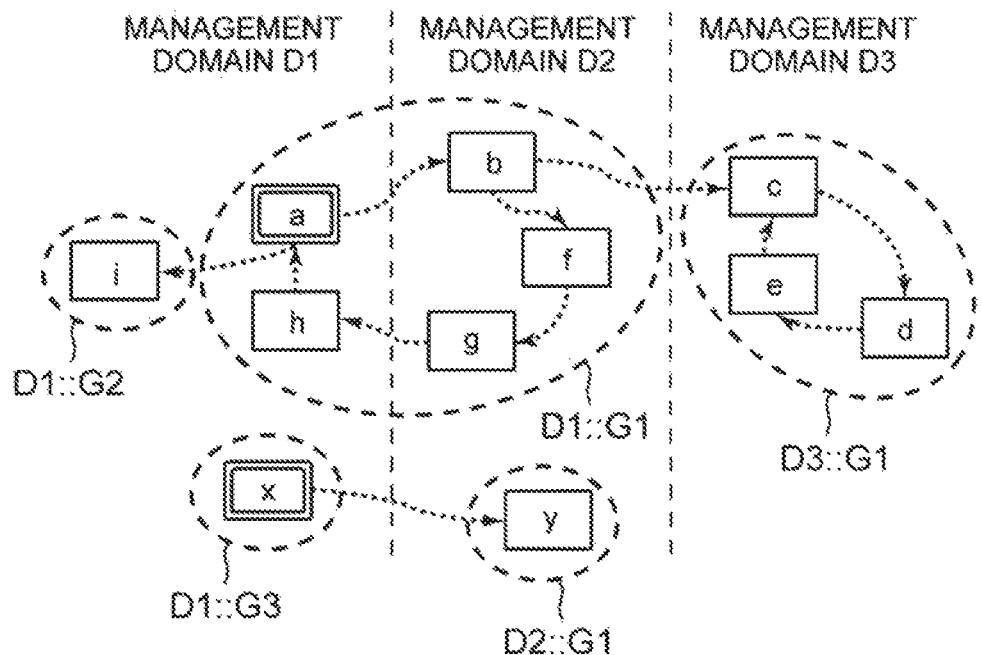
FIG. 21 is an explanatory diagram showing an example of groups to be generated in the process of division into groups in step S1400.

As a result of execution of a process of division into strongly connected components, the group of state elements shown in FIG. 18 is divided into a plurality of groups shown in FIG. 21. FIG. 21 is an explanatory diagram showing an example of groups to be generated in the process of division into groups in step S1400. A dashed-line ellipse shown in FIG. 21 represents a group to be generated in the process of division into groups.

Figure 22:
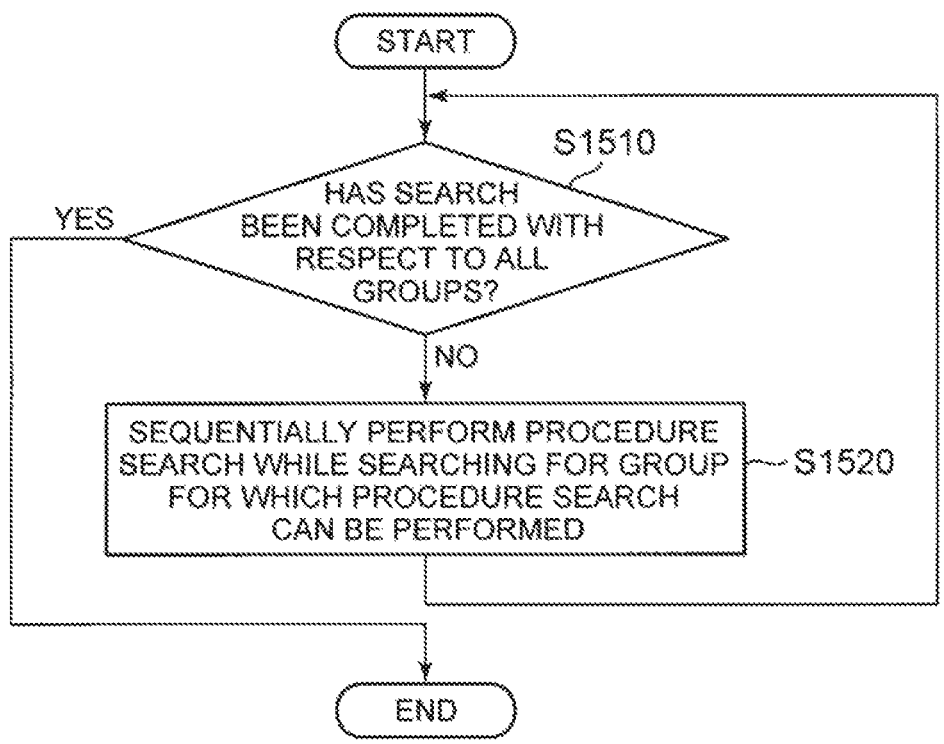
FIG. 22 is a flowchart showing the overall operation of planning to be performed by a planning unit 102 according to the first exemplary embodiment.

Next, planning in step S1500 will be described. FIG. 22 is a flowchart showing the overall operation of planning to be performed by the planning unit 102 according to the first exemplary embodiment.

In order to make a search for a procedure for all the groups, the planning unit 102 checks all the management domains, and confirms whether there remains any group for which a search for a procedure has not been performed (step S1510). When there remains no group for which a search for a procedure has not been performed (Yes in step S1510), the planning unit 102 terminates the planning.

When there remain groups for which a search for a procedure has not been performed (No in step S1510), the planning unit 102 picks out one of the groups for which a search for a procedure has not been performed. Next, the planning unit 102 sequentially performs a procedure search process while searching for a group for which a procedure search can be performed, by performing a depth-first search process with the group picked out as a starting point (step S1520). After performing the depth-first search process, the planning unit 102 performs the process of step S1510 again.

A group is regarded as a group for which a procedure search can be performed, in the case where there is no relationship between a state element in another group, for which a procedure search has not been performed, and a state element in its own group. Alternatively, a group is regarded as a group for which a procedure search can be performed, in the case where there is no relationship specifying a state element in its own group, between a state element in another group, for which a procedure search has not been performed, and the state element in its own group.

In the example shown in FIG. 21, the state element "i" in a group "D1::G2" has a relationship with the state element "a" in the group "D1::G1," and the state element "i" is specified in the relationship. That is, the group "D1::G2" is not a group for which a procedure search can be performed.

In addition, all the state elements in the group "D1::G1" have no relationships, as described above, with state elements in other groups. That is, the group "D1::G1" is a group for which a procedure search can be performed. Note that after the procedure search process for the group "D1::G1" is performed, the group "D1::G2" becomes a group for which a procedure search can be performed.

In the case where the group "D1::G2" is first selected as a group for which a search for a procedure has not been performed in the example shown in FIG. 21, the planning unit 102 performs a first depth-first search process, with the group "D1::G2" as a starting point, while regarding a group as a node and regarding, as an edge, an arrowed line in a direction opposite to a direction of an arrowed line representing a relationship between groups.

Next, the planning unit 102 performs a procedure search process in order from a terminus. As a result, the procedure search process is performed in the order of the group "D1::G1" and the group "D1::G2." Thus, a first round of the first depth-first search process, which is the process of step S1520, is completed. Subsequently, the planning unit 102 repeatedly performs a similar process. As a result, the procedure search process is performed for all the groups.

Figure 23:
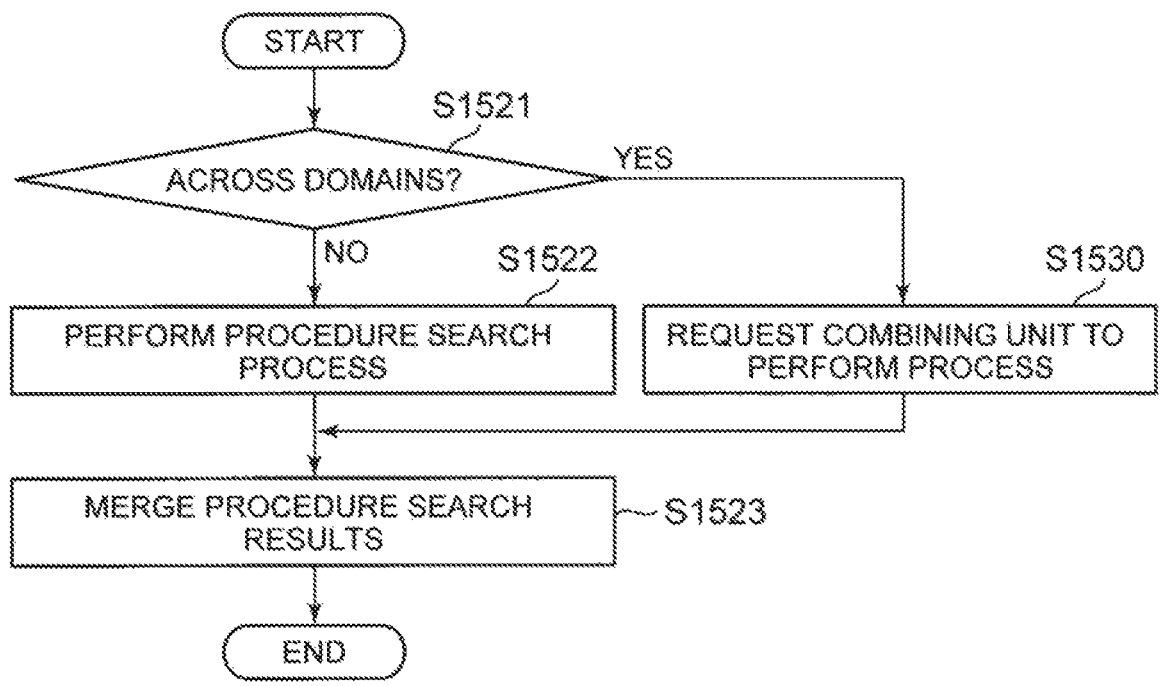
FIG. 23 is a flowchart showing the operation of a procedure generating process to be performed by the planning unit 102 according to the first exemplary embodiment.

Subprocesses included in the planning will be described below. First, a procedure generating process in step S1520 will be described. FIG. 23 is a flowchart showing the operation of a procedure generating process to be performed by the planning unit 102 according to the first exemplary embodiment. The process shown in FIG. 23 is a process of procedure planning for a single group.

The planning unit 102 confirms whether a group for which a process is intended exists across a plurality of management domains (step S1521). In the case where the group does not exist across a plurality of management domains (No in step S1521), the planning unit 102 performs a procedure search process in a management domain in which the group exists, and generates a partial procedure (step S1522). After generating the partial procedure, the planning unit 102 performs a process of step S1523.

In the case where the group exists across a plurality of management domains (Yes in step S1521), the planning unit 102 requests the combining unit 120 to perform a process of generating a partial procedure (step S1530). In the process of step S1530, a planning system in a management domain, as a starting point of a process of generating a change procedure, requests the combining unit 120 to perform a procedure search process for the group for which the process is intended. The combining unit 120 generates a partial procedure in each related management domain.

FIG. 24 is an explanatory diagram showing an example of communication content to be transmitted and received between a cooperation unit and a combining unit. FIG. 24 shows a request message to be transmitted from the cooperation unit to the combining unit so as to request a process of generating a change procedure at the left.

Details of the request shown in the left of FIG. 24 include a state element which is a member of a group in a management domain, as a request source, and a related domain in addition to a group id. Furthermore, as information on the state element, the details of the request also include a series of information required for a procedure search, that is, a possible state, a feasible state transition, a current state, and a target state.

FIG. 24 shows a reply message to be transmitted from the combining unit to the cooperation unit in response to the request for the process of generating a change procedure at the right. Details of the reply shown in the left of FIG. 24 include information indicating a partial procedure corresponding to a process result. After receiving the information indicating the partial procedure from the combining unit 120, the planning unit 102 performs the process of step S1523.

Next, the planning unit 102 combines the obtained partial procedure with a partial procedure obtained in a procedure generating process for another group (step S1523). After combining the partial procedures, the planning unit 102 terminates the procedure generating process.

Note that the cases where the group exists across management domains include not only a case where members belonging to the group exist in two or more management domains, but also a case where a member has a relationship with a state element in another management domain. This is because a procedure search process is also required to be performed for the state element in the another management domain, with which the member belonging to the group has a relationship, as well as the group.

In the example shown in FIG. 21, it is determined that the group "D1::G1," a group "D2::G1," and a group "D3::G1" are groups existing across a plurality of management domains.

Note that the procedure search process of step S1522 is performed in accordance with, for example, the method described in PTL 2. In addition, the process of combining partial procedures in step S1523 is performed in accordance with, for example, the method described in PTL 3.

Figures 25, 26:
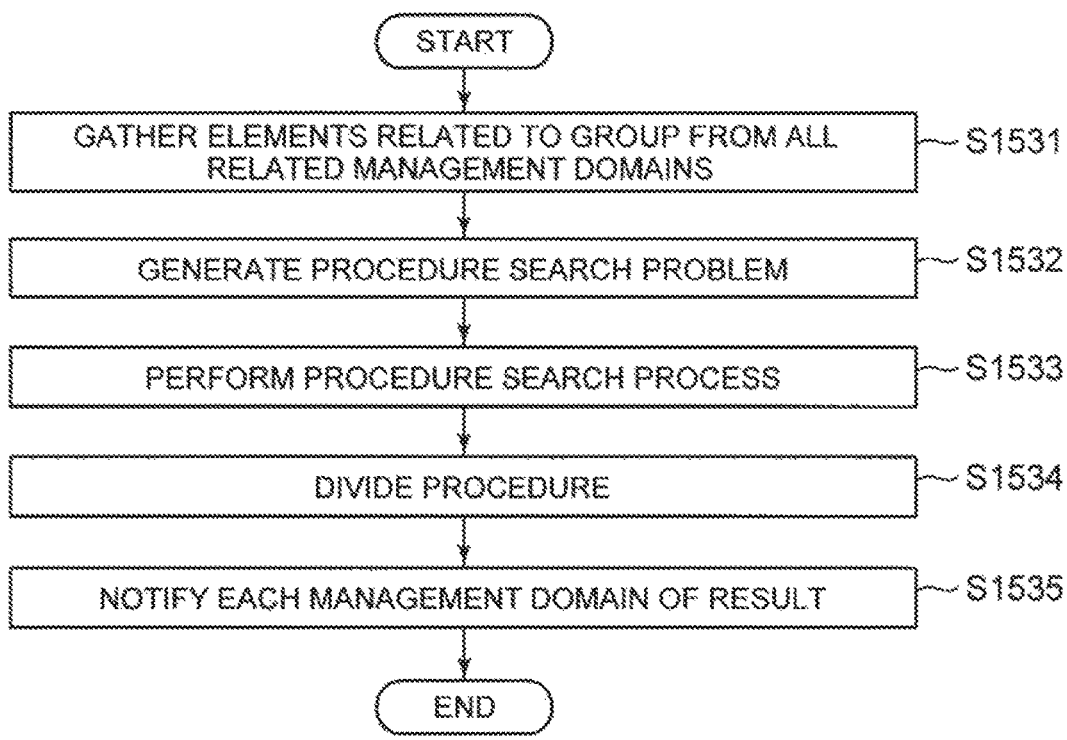
FIG. 25 is a flowchart showing the operation of a procedure search process to be performed by a combining unit 120 according to the first exemplary embodiment.
FIG. 26 is an explanatory diagram showing another example of communication content to be transmitted and received between the cooperation unit and the combining unit.

Described below is the procedure search process of step S1530 included in the procedure generating process. FIG. 25 is a flowchart showing the operation of a procedure search process to be performed by the combining unit 120 according to the first exemplary embodiment.

Upon accepting a request for a process of generating a partial procedure from the planning system 100, the combining unit 120 gathers state elements related to the group for which the process is intended, from all the management domains described as related domains (step S1531).

Next, the combining unit 120 generates a procedure search problem by combining the gathered state elements (step S1532). Then, the combining unit 120 performs a procedure search process on the generated procedure search problem to generate a procedure for changing a system configuration (step S1533).

After generating the procedure for changing the system configuration, the combining unit 120 divides the generated change procedure on the basis of information gathered from each related domain (step S1534). Next, the combining unit 120 notifies the planning system in each management domain of each partial procedure obtained as a result of the division (step S1535). After notifying each partial procedure to each planning system, the combining unit 120 terminates the procedure search process.

FIG. 26 is an explanatory diagram showing another example of communication content to be transmitted and received between the cooperation unit and the combining unit. FIG. 26 shows a request message to be transmitted from the combining unit to the cooperation unit so as to request information at the left. Details of the request shown in the left of FIG. 26 include a group id required by the combining unit 120 for a procedure search process.

FIG. 26 shows a reply message to be transmitted from the cooperation unit to the combining unit at the right. Details of the reply shown in the right of FIG. 26 include specific information on state elements which are members of a group indicated by the transmitted group id.

Figures 27, 28:
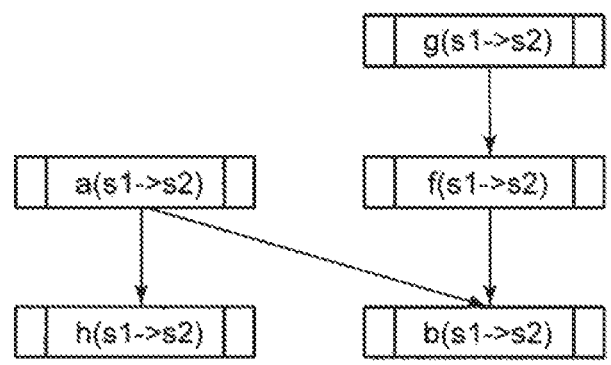
FIG. 27 is an explanatory diagram showing an example of information recorded in the combining unit 120.
FIG. 28 is an explanatory diagram showing an example of a procedure for changing a system configuration, to be generated by the combining unit 120.

FIG. 27 is an explanatory diagram showing an example of information to be recorded in the combining unit 120. For example, in the case where the combining unit 120 is requested to perform a process of generating a partial procedure for the group "D1::G1," the combining unit 120 gathers information required for a procedure search process, from all the related domains.

After gathering the information, the combining unit 120 generates information on state elements for each management domain as shown in FIG. 27. Note that for the sake of simplicity, information indicating details of state elements other than the state element "a" has been omitted in FIG. 27.

When information on a management domain is removed from a relationship including the information on the management domain such as "D2::b.s1" in a prior state constraint of the state element "a" shown in FIG. 27, it is possible to obtain a procedure search problem in a form similar to that of a general procedure search problem. Consider the case where the combining unit 120 performs a procedure search process on the procedure search problem generated from the information shown in FIG. 27, and consequently, a procedure for changing a system configuration shown in FIG. 28 is generated.

FIG. 28 is an explanatory diagram showing an example of a procedure for changing a system configuration, to be generated by the combining unit 120. FIG. 28 shows a procedure for changing a system configuration, generated by the combining unit 120, before division of the procedure. A rectangle shown in FIG. 28 represents a procedure. In addition, characters in the rectangle represent work to be performed in the procedure.

By referring to the information shown in FIG. 27, the combining unit 120 understands that the state element "a" and the state element "h" are state elements derived from the management domain D1. Furthermore, the combining unit 120 understands that the state element "b," the state element "f," and the state element "g" are state elements derived from the management domain D2.

Therefore, the combining unit 120 can divide the obtained procedure for changing the system configuration into a step "a(s1→s2)" and a step "h(s1→s2)" derived from the management domain D1, and a step "g(s1→s2)," a step "f(s1→s2)," and a step "b(s1→s2)" derived from the management domain D2.

Moreover, the combining unit 120 generates "D1::G1.X" or the like as appropriate unique identification information in the case where the generated change procedure is a procedure to be followed in sequence across a plurality of management domains, such as the case where a step "b(s1→s2)" is executed after execution of the step "a(s1→s2)."

Next, the combining unit 120 places a command "call D1::G1.X" after the step "a(s1→s2)" to be executed earlier. Furthermore, the combining unit 120 places a command "wait D1::G1.X" before the step "b(s1→s2)" to be executed later.

Figure 29:
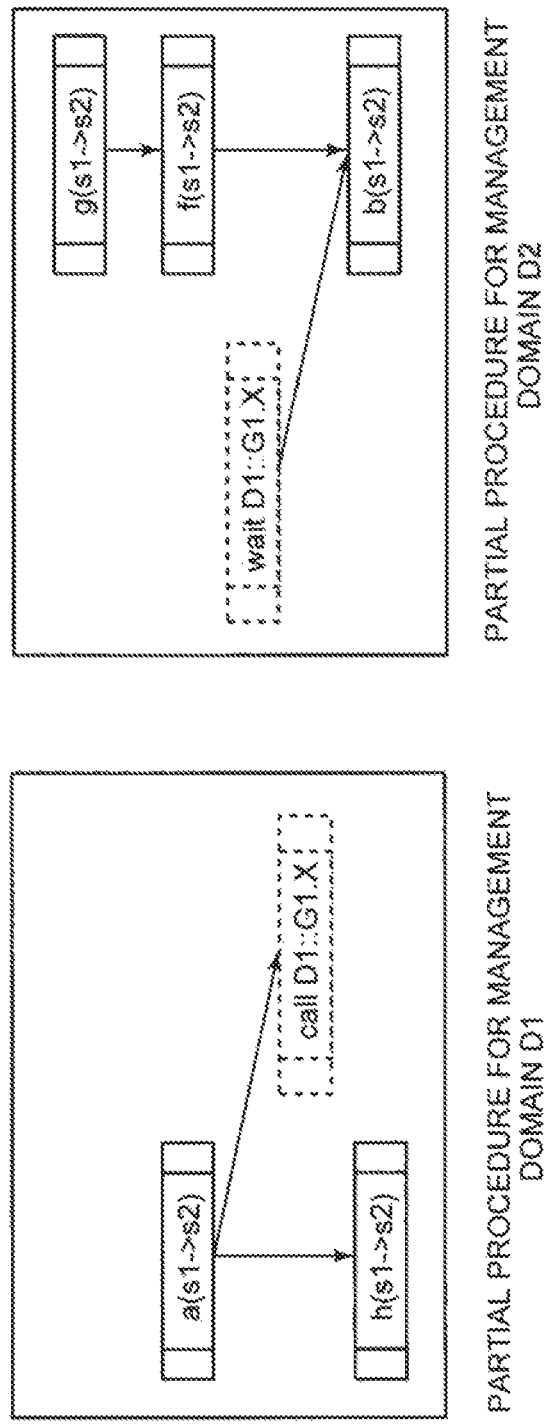
FIG. 29 is an explanatory diagram showing another example of the procedure for changing a system configuration, to be generated by the combining unit 120.

The change procedure in which each command has been placed is shown in FIG. 29. FIG. 29 is an explanatory diagram showing another example of the procedure for changing a system configuration, to be generated by the combining unit 120. FIG. 29 shows the procedure for changing a system configuration, generated by the combining unit 120, after division of the procedure.

FIG. 29 shows a partial procedure to be executed by the planning system in the management domain D1 at the left. Furthermore, FIG. 29 shows a partial procedure to be executed by the planning system in the management domain D2 at the right. As described above, the combining unit 120 performs the procedure search process. As a result, a partial procedure to be executed by each planning system is completed.

After all the above processes are completed, there is generated a series of procedures for changing a system configuration as shown in, for example, the under right of FIG. 7. The series of procedures is generated for respective management domains, and involves a linkage between the management domains. The planning system in each management domain can confirm in advance the influence of the system configuration change on a system managed by itself, by confirming the partial procedure generated for each management domain. The planning systems in the respective management domains simultaneously perform change processes according to the procedure for changing the system configuration, by using the respective control devices 400 and the like. Thus, a series of changes in the system configuration is cooperatively performed.

Note that the cooperation unit 101 of the planning system 100 according to the present exemplary embodiment may perform a process set forth below.

The method described in the present exemplary embodiment has a problem in that unnecessary information on a state element defined in a predetermined management domain is also notified to another management domain and the combining unit 120. Basically, information on a state element just needs to be grasped simply by the planning system in a management domain managing the state element.

For example, when a relationship across a plurality of management domains is specified, an alias may be used for an id indicating a state element and information on a state. Furthermore, when also requesting the combining unit 120 to conduct procedure planning, the cooperation unit 101 just needs to make a request after converting the id indicating a state element and information on a possible state into aliases, and to read the aliases in a received change procedure as the original information.

As a variation of the present exemplary embodiment, a cooperation unit 101 includes an information table for managing information on state elements in association with information in which information has been anonymized. When transmitting information to another management domain or a combining unit 120, the cooperation unit 101 transmits the anonymized information. Furthermore, when receiving information from another management domain or the combining unit 120, the cooperation unit 101 further performs a process of restoring the anonymized information to the original information.

FIG. 30 is an explanatory diagram showing an example of anonymous information for each management domain. FIG. 30 shows anonymous information in a management domain D1 at the left. FIG. 30 shows anonymous information in a management domain D2 at the right. The cooperation unit 101 according to the present variation records anonymous information concerning a state element and a field to be described below as shown in FIG. 30. By using the recorded anonymous information, the cooperation unit 101 performs an anonymization process and the process of restoring the anonymized information to the original information.

"Reproduction information" shown in FIG. 30 is correspondence information to be used for obtaining original information from anonymized information. In addition, "anonymization information" is correspondence information to be used for anonymizing original information with consistency.

In the case where there is generated a new state element or a new field to be anonymized, the cooperation unit 101 generates a cryptonym, and adds the cryptonym to the "anonymization information." The cooperation unit 101 just needs to appropriately generate and use a random character string or the like as a cryptonym.

According to the present variation, even in the case where respective systems managed by a plurality of management domains are related to each other, there is generated a procedure for changing a system configuration while the management domains keep details of system configuration definitions encrypted from each other.

[Description of Effect]

The planning system 100 according to the present exemplary embodiment can generate a procedure for changing a system configuration even in the case where respective systems managed by a plurality of management domains are related to each other, and there is no constituent element having an overall understanding. In the present exemplary embodiment, a procedure for changing a system configuration is generated as a set of partial procedures generated in respective management domains such that a series of changes in the system configuration that affects a plurality of the management domains is implemented by cooperative operation by the planning systems in the respective management domains.

The planning system 100 according to the present exemplary embodiment includes the cooperation unit 101 and the planning unit 102. A system configuration definition is represented by a set of constituent elements and relationships between constituent elements. In addition, the relationships include relationships with constituent elements in system configuration definitions managed by a group of other planning systems.

The planning unit 102 communicates with the group of other planning systems via the cooperation unit 101, and cooperatively performs procedure planning. As a result of the procedure planning being cooperatively performed, there is generated a procedure for changing a system configuration concerning a relevant management domain, which is a part of a procedure for changing a system configuration that can be cooperatively executed by planning systems in a plurality of management domains.

When the combining unit 120 according to the present exemplary embodiment is used, the planning system is used even in the case where there are relationships between respective systems managed by the plurality of management domains. Each planning system can change a system configuration after confirming influence on each management domain. Furthermore, even in the case where it is inevitable that state elements are gathered in one place for performing a procedure search process, the adjustment unit 103 according to the present exemplary embodiment can reduce the number of state elements to be gathered.

When the method of the present exemplary embodiment is used, the planning system is used even in the case where respective systems managed by a plurality of management domains are related to each other. A user can change a system configuration after confirming influence on each management domain.

Second Exemplary Embodiment

[Description of Configuration]

Next, a second exemplary embodiment of the present invention will be described with reference to the drawings. FIG. 31 is a block diagram showing a configuration example of the second exemplary embodiment of the planning system according to the present invention.

As shown in FIG. 31, a planning system 100a according to the present exemplary embodiment includes a cooperation unit 101, a planning unit 102, an adjustment unit 103, and a compiling unit 104. That is, the configuration of the planning system 100a according to the present exemplary embodiment is similar to the configuration of the planning system 100 according to the first exemplary embodiment, except that the planning system 100a includes the compiling unit 104.

The compiling unit 104 has a function of converting a high-level system configuration definition input by a user as a request to change a system configuration, into a low-level system configuration definition that can be processed by the planning unit 102. Note that the compiling unit 104 is communicably connected to the planning unit 102 via a communication network or the like.

There is a problem that it is difficult to manually represent a definition of a large-scale system configuration in the method for representing a system configuration definition using a group of state elements shown in the first exemplary embodiment.

As a method capable of solving the above-described problem, PTL 3 describes a method for utilizing a high-level system configuration definition using a component in which partial configuration definitions including a plurality of groups of state elements are collectively abstracted in a reusable manner.

Figure 32:
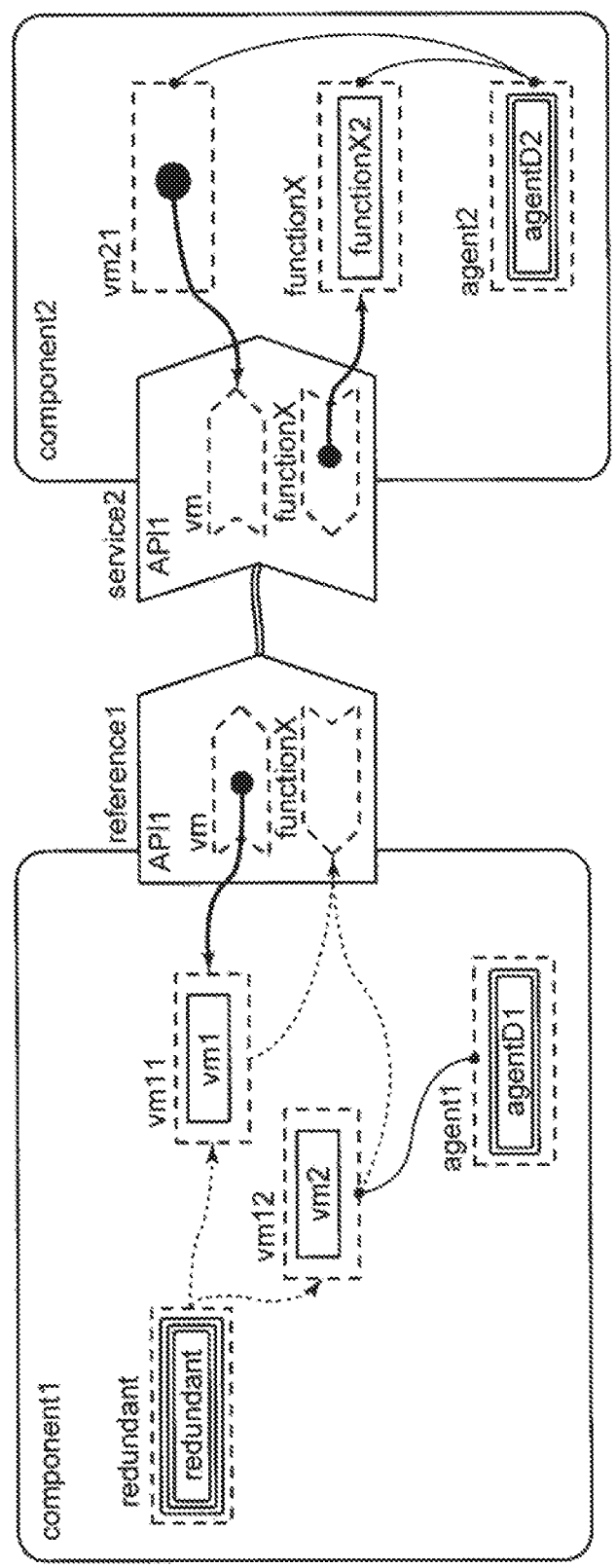
FIG. 32 is an explanatory diagram showing an example of a general high-level system configuration definition.

FIG. 32 is an explanatory diagram showing an example of a general high-level system configuration definition. In FIG. 32, a quadrilateral with rounded corners represents a component, and a solid-line rectangle represents a state element. Characters in the quadrilateral with rounded corners represent a name of the component. Characters in the solid-line rectangle represent a name of the state element. Note that for the sake of simplicity, no state or state transition in a state element is shown in FIG. 32.

FIG. 32 shows two components "component1" and "component2." In addition, the component "component1" includes two state elements "vm1" and "vm2." Furthermore, the component "component2" includes a state element "functionX2."

Moreover, each of an arrow-like pentagon with a solid line and a solid-line chevron, shown in FIG. 32, represents a port. Characters above the arrow-like pentagon with a solid line and characters on the upper left of the solid-line chevron represent names of the ports. In a general high-level system configuration definition, a component is combined with another component via a port. A connection between ports is also referred to as a wire.

Ports include a reference port for requesting a function and a service port for providing a function. The reference port has information on a function to be requested. Furthermore, the service port has information on a function to be provided. The wire is defined such that the wire connects, in any case, the reference port and the service port having information on the same function.

As shown in FIG. 32, the reference port is represented as an arrow-like pentagon with a solid line, the service port is represented as a solid-line chevron, and the wire is represented as a double line between the ports. A reference port "reference1" and a service port "service2" shown in FIG. 32 both have information on a function "API1."

In addition, each of a dashed-line rectangle and a chevron with a dashed line shown in FIG. 32 represents a field. Characters on the upper left of the dashed-line rectangle and characters above the chevron with a dashed line represent names of the fields. A field is a constituent element of a component for storing a state element. Note that the field of the chevron is a special field defined only in the port as described below.

In a general high-level system configuration definition, a relationship between state elements is abstractly defined via a field. For example, there is defined a relationship between a field "vm12" and a field "agent1" of the component "component1." That is, it is considered that there is a relationship between the state element "vm2" stored in the field "vm12" and a state element "agentD1" stored in the field "agent1," which is similar to the defined relationship between the fields.

In addition, the state element "agentD1" shown in FIG. 32 is a special state element representing a control module. As shown in FIG. 32, the control module is represented as a double-line rectangle. Furthermore, a relationship between a state element "A" and a control module "B," in which the control module "B" controls the state element "A," is represented by a solid line with black dots at both ends.

That is, a solid line existing between the field "vm12" and the field "agent1" shown in FIG. 32 indicates that the control module "agentD1" in the field "agent1" performs operations such as deployment and deletion of state elements in the field "vm12."

In addition, a state element "redundant" shown in FIG. 32 is a special state element representing a general constraint condition on a plurality of state elements. Details of the condition are defined for each constraint condition. As shown in FIG. 32, the constraint condition is represented as a triple-line rectangle. Furthermore, as with the case of a prior state constraint, an arrowed dashed line extending from a constraint condition to a state element indicates that the state element conforms to the constraint condition.

The constraint condition "redundant" shown in FIG. 32 restricts, for example, operation of the planning unit 102 in procedure planning and operation of a control device 400 such that at least one of related state elements, that is, the state element "vm1" and the state element "vm2" is in a startup state.

When a plurality of components is combined, state elements included in each component are collectively associated with each other. For example, the state element "vm1" in the component "component1" shown in FIG. 32 is associated with a control module "agentD2" in the component "component2."

This is because the state element "vm1" is connected to a field "vm21" in the component "component2" via the port. That is, the state element "vm1" also has the same relationship as a defined relationship between the field "vm21" and a field "agent2."

Similarly, the state element "functionX2" in the component "component2" is associated with each of the state element "vm1" and the state element "vm2" in the component "component1."

In order to represent a definition as described above, a field is defined in a port in a general high-level system configuration definition. In addition, a state element stored in a field in a component is connected to a field in a port owned by the component.

Fields in a port include an acceptance field represented as a right-pointing chevron and a providing field represented as a left-pointing chevron. A state element is connected, through a reference port, to a service port via the acceptance field. In addition, a state element is connected, through the service port, to the reference port via the providing field.

In the example shown in FIG. 32, a field "vm" has been defined in the port "reference1" owned by the component "component1." Furthermore, the field "vm" refers to a field "vm11."That is, the state element "vm1" stored in the field "vm11" is connected to the field "vm" in the port "reference1."

As shown in FIG. 32, an arrowed line with a black dot as a starting point in a field indicates that the field refers to a state element. Note that a direction in which the state element is connected is opposite to a direction of the arrowed line indicating the reference.

As described above, two ports to be combined have information on the same function. In addition, ports having information on the same function include corresponding fields.

The state element "vm1" shown in FIG. 32 is further connected, through the field "vm" in the port "reference1," to a field "vm" in the port "service2." Finally, the state element "vm1" is connected, through the field "vm," to the field "vm21" in the component "component2."

Since description as described above is used, components including ports having the same function are represented in combination with a different component when a high-level system configuration definition is used. That is, use of the high-level system configuration definition described above offers an advantage in that various system configurations are defined. Specifying a relationship via a field and connecting a state element to a plurality of fields are also characteristics for achieving a similar advantage.

Compilation of a general high-level system configuration definition into a low-level system configuration definition is a process of generating a group of state elements obtained by associating state elements in a component with each other on the basis of definitions relating to the component and a combination relationship between components.

Figure 33:
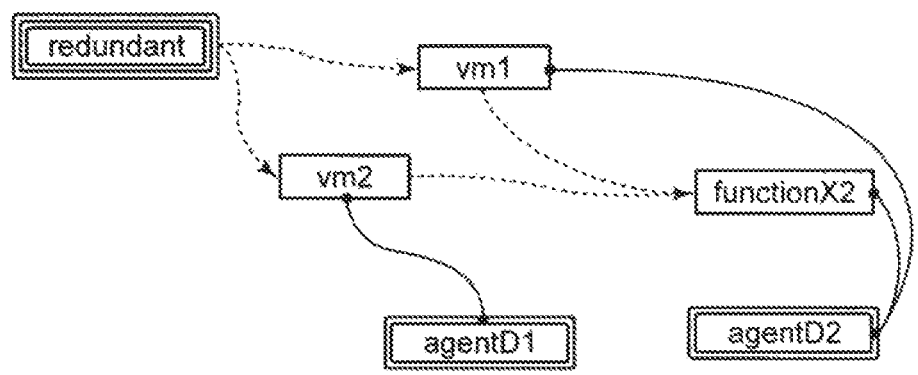
FIG. 33 is an explanatory diagram showing an example of a low-level system configuration definition obtained by compilation of the high-level system configuration definition.

A result of compilation of the system configuration definition shown in FIG. 32 is shown in FIG. 33. FIG. 33 is an explanatory diagram showing an example of a low-level system configuration definition obtained by compilation of the high-level system configuration definition.

In the high-level system configuration definition of the present exemplary embodiment, there is combined a plurality of components existing in different management domains. The compiling unit 104 according to the present exemplary embodiment generates a low-level system configuration definition across a plurality of management domains on the basis of a high-level system configuration definition in which there is combined a plurality of components existing in different management domains.

In order to implement the above process, the system configuration definition of the present exemplary embodiment specifies that the service port is to be disclosed to the outside, and also defines a combination relationship with a port in another management domain disclosed to the outside.

Figure 34:
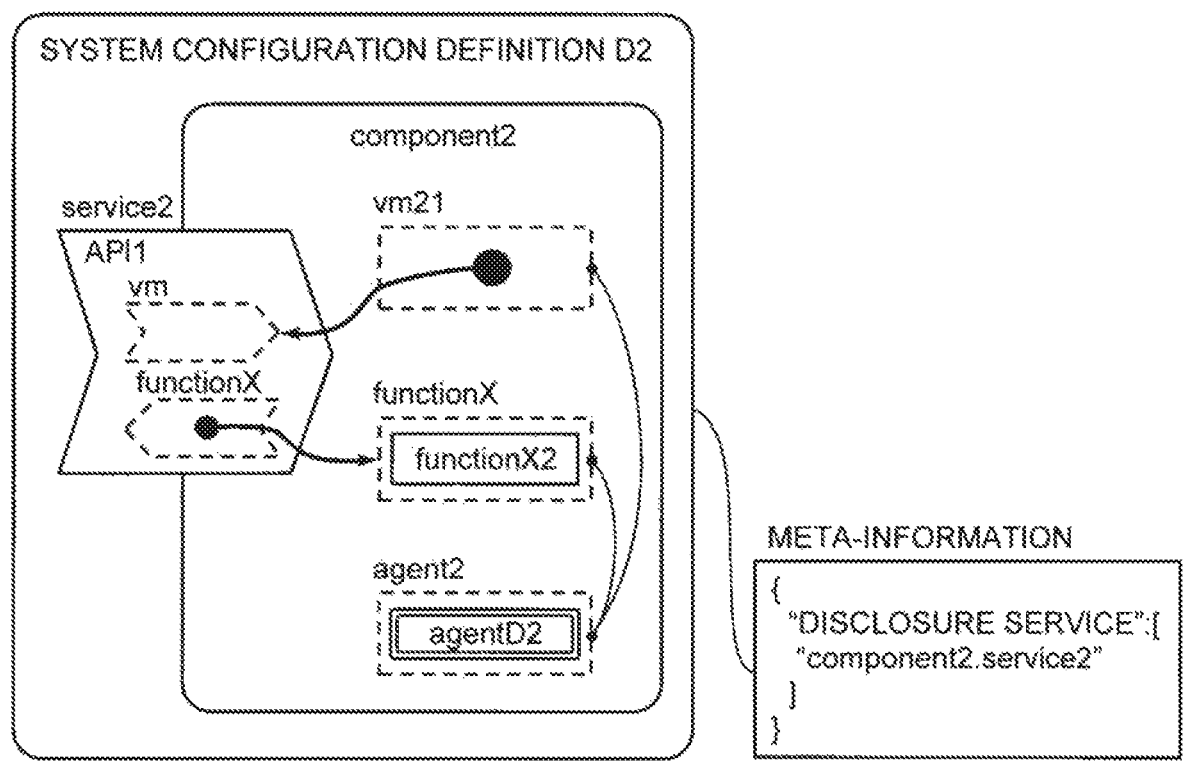
FIG. 34 is an explanatory diagram showing an example of the high-level system configuration definition according to the second exemplary embodiment.

FIG. 34 is an explanatory diagram showing an example of the high-level system configuration definition according to the second exemplary embodiment. FIG. 34 shows a system configuration definition in a management domain D2. In meta-information shown in FIG. 34, it is specified that a service provided by the service port "service2" owned by the component "component2" is a "disclosure service." Note that the meta-information is information for further defining information in the system configuration definition.

Figure 35:
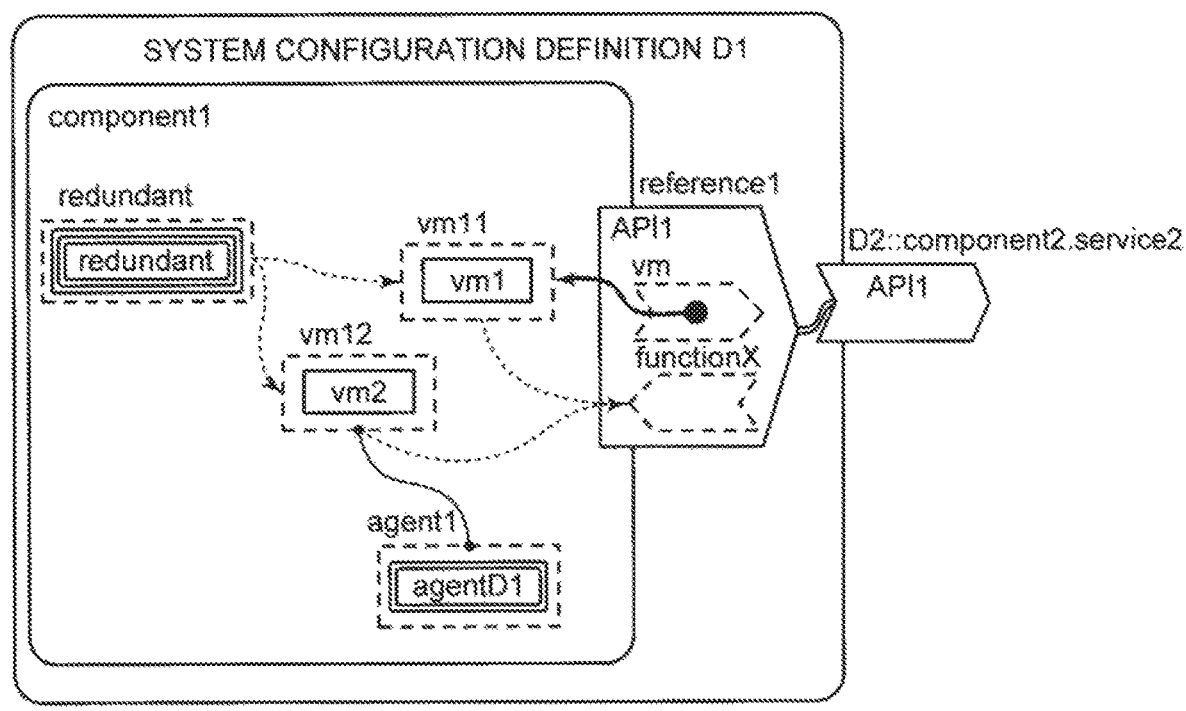
FIG. 35 is an explanatory diagram showing another example of the high-level system configuration definition according to the second exemplary embodiment.

FIG. 35 is an explanatory diagram showing another example of the high-level system configuration definition according to the second exemplary embodiment. FIG. 35 shows a system configuration definition in a management domain D1. A port "D2::component2.service2" shown in FIG. 35 indicates that the reference port "reference1" refers to the service port "service2" owned by the component "component2" in the management domain D2. That is, the reference port "reference1" is connected to the service port "D2::component2.service2." As a result, there is defined a wire extending across a plurality of management domains.

Note that an expression such as "component2.service2," shown in FIG. 35, in which nouns are put together with "." interposed therebetween, represents an inclusion relation meaning "service2" in "component2." Other descriptions also have similar meanings.

Figure 36:
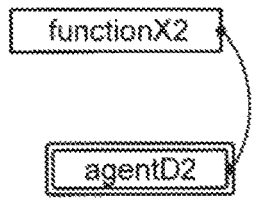
FIG. 36 is an explanatory diagram showing an example of the low-level system configuration definition obtained by compilation of the high-level system configuration definition according to the second exemplary embodiment.

When the high-level system configuration definition shown in FIG. 34 is compiled alone, a low-level system configuration definition as shown in FIG. 36 is generated in the management domain D2. FIG. 36 is an explanatory diagram showing an example of the low-level system configuration definition obtained by compilation of the high-level system configuration definition according to the second exemplary embodiment.

Figure 37:
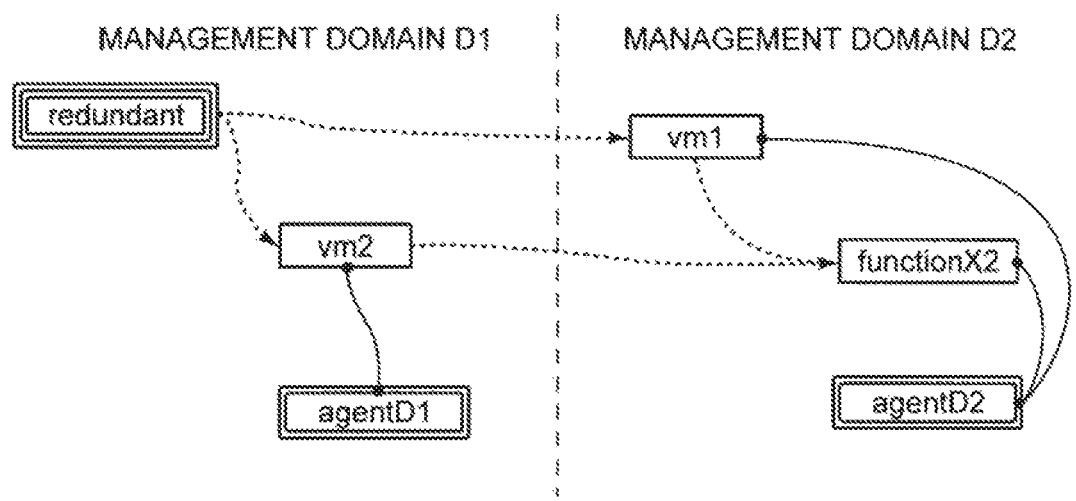
FIG. 37 is an explanatory diagram showing another example of the low-level system configuration definition obtained by compilation of the high-level system configuration definition according to the second exemplary embodiment.

When the high-level system configuration definition shown in FIG. 35 is compiled by a planning system in the management domain D1 and a planning system in the management domain D2, which are related to the definition, in cooperation with each other, a low-level system configuration definition as shown in FIG. 37 is generated in each management domain. FIG. 37 is an explanatory diagram showing another example of the low-level system configuration definition obtained by compilation of the high-level system configuration definition according to the second exemplary embodiment.

Figure 38:
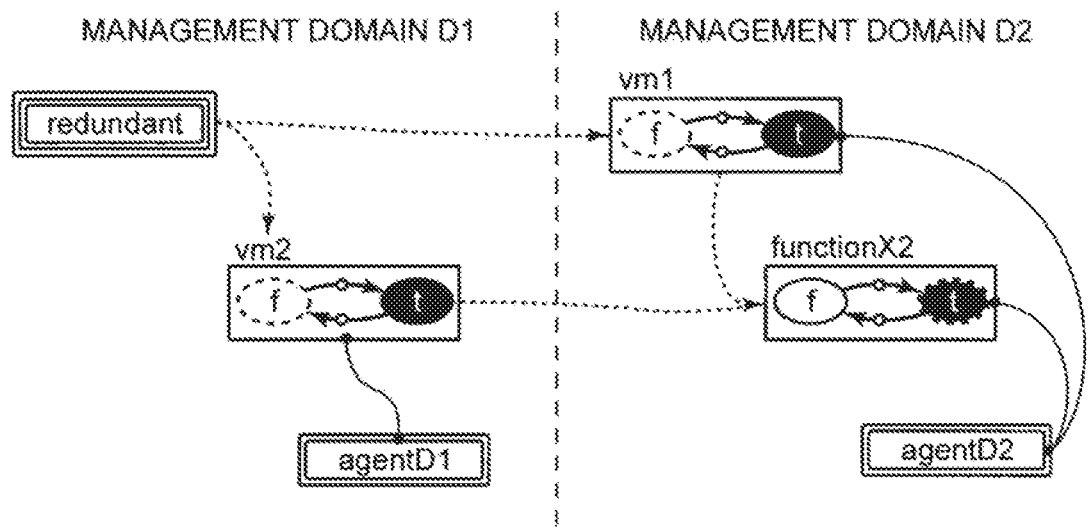
FIG. 38 is an explanatory diagram showing an example of a low-level definition of a request to change a system configuration according to the second exemplary embodiment.

For example, there is a method for comparing two system configuration definitions to determine a current state and a target state of each state element on the basis of a difference between the two definitions. FIG. 38 shows a definition of a request to change a system configuration, obtained from a difference between the system configuration definition shown in FIG. 36 and the system configuration definition shown in FIG. 37.

FIG. 38 is an explanatory diagram showing an example of a low-level definition of a request to change a system configuration according to the second exemplary embodiment. A state "t" shown in FIG. 38 represents a state in which a state element exists. Furthermore, a state "f" represents a state in which the state element does not exist.

For example, the state element "functionX2" exists in both the system configuration definition shown in FIG. 36 and the system configuration definition shown in FIG. 37. Thus, both the current state and the target state are the state "t." Furthermore, the state element "vm1" and the state element "vm2" exist only in the system configuration definition shown in FIG. 37. Thus, the current state is the state "f," and the target state is the state "t."

The definition of the request to change a system configuration shown in FIG. 38 is processed by the planning unit 102 by the method shown in the first exemplary embodiment, except for the constraint condition "redundant." The constraint condition is processed as described below. Furthermore, the planning unit 102 of the present exemplary embodiment may simply ignore the control module of the present exemplary embodiment.

In the present exemplary embodiment, a general state element that is neither a constraint condition nor a control module is connected to a field associated with a single control module in the course of compilation. A state element connected to a field after compilation is managed in a management domain where the field is managed. In the present exemplary embodiment, a field to which a state element is connected is referred to as a management field relating to the state element.

Furthermore, a relationship is defined in any field on a connection path of a state element. However, all relationships are required to be converted into relationships based on identification information defined in a management field relating to each state element after compilation.

[Description of Operation]

Figure 39:
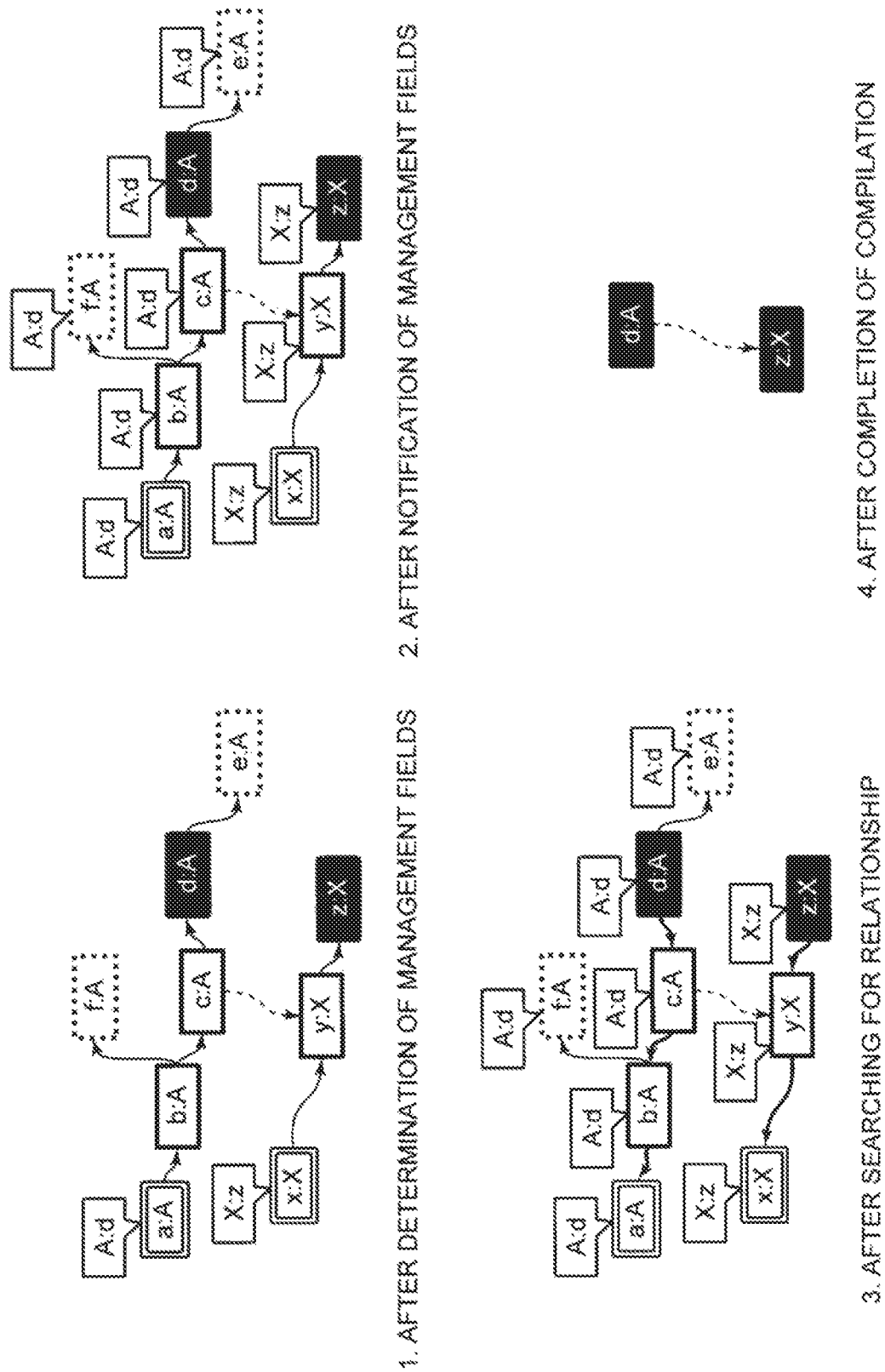
FIG. 39 is an explanatory diagram showing specific examples of a process of compiling the high-level system configuration definition, to be performed by a planning system 100a according to the second exemplary embodiment.

Operation of the planning system 100a according to the present exemplary embodiment will be described below with reference to FIGS. 39 and 40. FIG. 39 is an explanatory diagram showing specific examples of a process of compiling the high-level system configuration definition, to be performed by the planning system 100a according to the second exemplary embodiment.

In FIG. 39, a rectangle represents a field, and an arrowed solid line represents a connection path of a state element. In addition, a double-line rectangle represents a field defined as a field for storing a state element in the system configuration definition. Furthermore, a black rectangle represents a field associated with a control module.

In addition, characters in a field shown in FIG. 39 represent an id of the field and an id of a connected state element. For example, characters "a:A" in a field indicate that the id of the field is "a" and the id of the connected state element is "A."

Furthermore, a relationship defined in a manner to extend from a field "c" to a field "y" shown in the upper left of FIG. 39 has been converted into a relationship extending from a field "d:A" to a field "z:X," which is identification information defined in management fields shown in the under right of FIG. 39.

The above process corresponds to a process of converting a relationship defined in a manner to extend from a field "D1::component1.vm12" to a field "D1::component1.reference1.functionX" shown in FIG. 35 into a relationship extending from a state element "D1::vm2" to a state element "D2::functionX2" shown in FIG. 37.

First, for each state element, there are identified a graph including fields on a connection path, and a management field. In the case where the state element "A" is included in the field "a" in the example shown in the upper left of FIG. 39, a depth-first search process is performed from the field "a" as a starting point. As a result, a management field of the state element "A" is identified as a field "d."

As a result of the identification, a fact that the management field of the state element "A" is the field "d" is recorded in the field "a." In FIG. 39, recorded information is shown in a balloon above a field.

In addition, a field "b" and the field "c" existing on a path from the field "a" to the field "d" are recorded as fields on a main connection path of the state element "A." In FIG. 39, a solid-line rectangle represents a field on a main connection path, and a broken-line rectangle represents another field. The compiling unit 104 also performs similar operation for a state element "X" in a field "x."

Next, the compiling unit 104 notifies information on a determined management field to each field on a connection path. FIG. 39 shows a state of the system configuration definition at the time when the information on the management field is notified at the upper right.

Next, the compiling unit 104 performs a depth-first search process on the graph of the connection path, with the management field as a starting point, to gather relationships. In order to set the management field as the starting point of the depth-first search, the compiling unit 104 performs a search process in a direction opposite to a direction of a search on the "main connection path" described above.

This is because in the case of, for example, searching the connection path of the state element "A," starting from the field "d" shown in the upper left of FIG. 39, directions of edges at a relevant part are required to be reversed so as to search for the fields "c," "b," and "a."

In the example shown in the under left of FIG. 39, a definition of a relationship with the field "y" is found in the field "c" in the search for the state element "A" started from the field "d." Subsequently, it is understood that the relationship just needs to be finally connected to the field "z:X" with reference to a field "z" that is a management field of the state element "X" recorded in the field "y."

FIG. 39 shows a generated compilation result at the under right. The compiling unit 104 according to the second exemplary embodiment performs operation as described above in cooperation with planning systems in a plurality of management domains.

Figure 40:
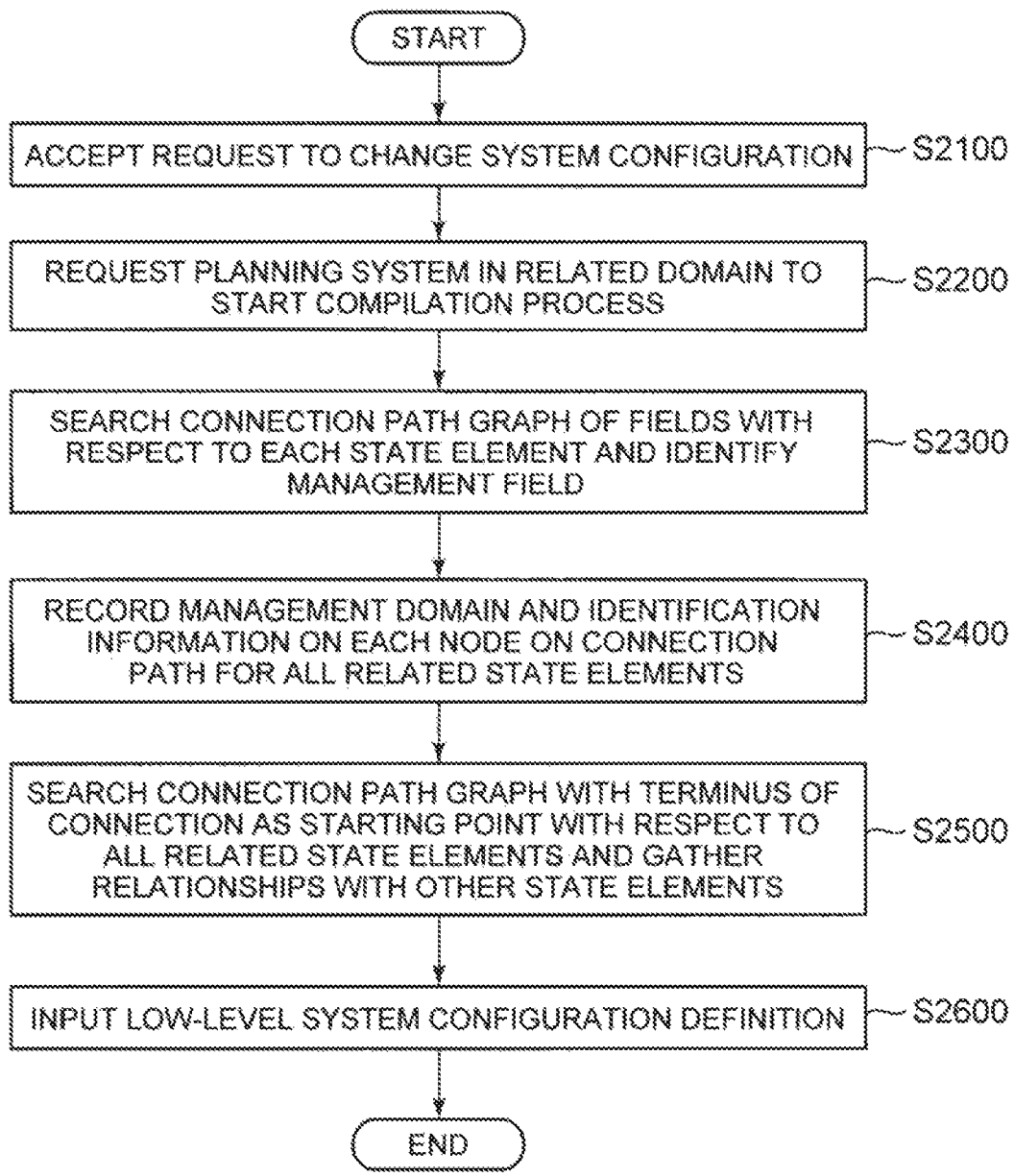
FIG. 40 is a flowchart showing the operation of a process of compiling the high-level system configuration definition to be performed by the planning system 100a according to the second exemplary embodiment.

FIG. 40 is a flowchart showing the operation of a process of compiling the high-level system configuration definition to be performed by the planning system 100a according to the second exemplary embodiment.

The planning unit 102 according to the present exemplary embodiment accepts a request to change a system configuration from a user via an input/output device 200 (step S2100). Next, the planning unit 102 generates a change request id for uniquely identifying the accepted request to change the system configuration.

Then, the planning unit 102 generates, in a storage device 300, a storage area for recording information concerning the request to change the system configuration. After generating the storage area, the planning unit 102 transfers the request to change the system configuration to the compiling unit 104.

The compiling unit 104 extracts information on a port in a related management domain other than a management domain in which the compiling unit 104 exists, from a high-level system configuration definition in the transferred request to change the system configuration. Next, the compiling unit 104 requests a planning system in the related management domain via the cooperation unit 101 to start a compilation process (step S2200).

The planning system in the management domain that has accepted the request to start the compilation process generates a storage area concerning the compilation process. FIG. 41 is an explanatory diagram showing an example of communication content to be transmitted and received at the time of a request to start a compilation process and at the time of a reply. FIG. 41 shows a request message to start a compilation process at the left. Furthermore, FIG. 41 shows a reply message in response to the request to start the compilation process at the right.

Next, the compiling units 104 in all the related management domains perform a depth-first search process, starting from a field in which a state element has been defined. In the depth-first search process, a field is regarded as a node, and an arrowed line pointing in a direction opposite to a direction of an arrowed line representing reference is regarded as an edge. The compiling unit 104 forms a graph including a connection path of each state element, and also identifies a management field (step S2300).

For example, in a depth-first search process concerning the state element "vm1" shown in FIG. 35, a search is started from a field "component1.vm11" in which the state element "vm1" is stored first. Another field "component1.reference1.vm" refers to the field "component1.vm11." Thus, the field "component1.reference1.vm" becomes one of next nodes on the connection path.

Then, the planning system in the management domain D2, which has been requested to make a search, continues to perform the search since the port "reference1" is connected to the port "D2::component2.service2" in another management domain.

FIG. 42 is an explanatory diagram showing an example of communication content to be transmitted and received at the time of a request to make a search for a management field and at the time of a reply. FIG. 42 shows a request message to make a search for a management field at the left. As shown in the left of FIG. 42, a planning system in a management domain as a search requestor includes, in a request message, an id indicating a state element to be searched for and a field as a search destination.

Furthermore, FIG. 42 shows a reply message in response to the request to make a search for the management field at the right. As shown in the right of FIG. 42, when the management field of the state element is found, a planning system in a management domain that has been requested to make a search returns the found management field.

Incidentally, FIG. 43 is an explanatory diagram showing an example of recorded information for each management domain during a search for a management field. FIG. 44 is an explanatory diagram showing another example of recorded information for each management domain during a search for a management field. As shown in FIGS. 43 and 44, at the start of a depth-first search process for each state element, the planning system first records, in an item "state element," information indicating a state element to be searched for and a start field.

When each field has been searched, the planning system adds an id indicating the searched field to an item "connection path" in the recorded state element. In addition, the planning system records a next field and a previous field on the connection path on the basis of reference relationships between fields.

If the searched field is a management field, the planning system records the searched field as the management field of the state element in an item "management field." When finishing the search of the fields and returning the process to the planning system as the search source, the planning system records "yes" in an item "main connection path" of the state element if the management field has been found.

Alternatively, if the management field has not been found, the planning system records "no" in the item "main connection path" of the state element. After recording the information in the item "main connection path," the planning system returns information on the management field to the planning system as the search source.

In the case where a planning system is requested to make a search, by a planning system in another management domain, the planning system first records, in the item "state element," information indicating a state element to be searched for in the requested search. After recording the information, the planning system similarly adds information indicating a field on the connection path.

FIG. 43 shows recorded information indicating that the state element "vm1" in the management domain D1 and the state element "D2::functionX2" are state elements to be searched for. In addition, FIG. 44 shows recorded information indicating that a state element "D1::vm1" and the state element "functionX2" in the management domain D2 are state elements to be searched for.

Note that with regard to a state element that is not connected at all, the start field and the management field are the same field, that is, a field "component1.vm12," as with the case of the state element "vm2" in the management domain D1 shown in FIG. 43. In addition, the connection path also includes only the field "component1.vm12." In FIG. 43, specific information on unconnected state elements other than the state element "vm2" has been omitted.

Next, the compiling units 104 in all the related management domains perform a depth-first search process, starting from a field in which a state element has been defined. In the depth-first search process, a field is regarded as a node, and an arrowed line pointing in a direction opposite to a direction of an arrowed line representing reference is regarded as an edge. The compiling unit 104 records the management field of each state element in each field (step S2400).

FIG. 45 is an explanatory diagram showing an example of recorded information for each management domain after notification of information on a management field. FIG. 45 shows recorded information in the management domain D1 at the left. FIG. 45 shows recorded information in the management domain D2 at the right.

Next, the compiling units 104 in all the related management domains perform a depth-first search process with the management field as a starting point, to gather information indicating relationships (step S2500). For example, the item "management field" shown in FIG. 44 includes a record to the effect that the management field of the state element "D1::vm1" is "component2.vm21."

Therefore, the compiling unit 104 starts a search from "component2.vm21" in "D1::vm1" in the item "state element" shown in FIG. 44. Basically, an object to be searched for is a field described in an item "next field." Note that if the field described in the item "next field" exists on the main connection path, that is, if "yes" is shown in the item "main connection path," a field described in an item "previous field" is also to be searched for.

When a relationship is found during the search, the compiling unit 104 refers to the management field, and returns information in which the management field has been added to the found relationship, to the planning system as the search source. In the example shown in FIG. 35, the field "component1.vm11" has relationships defined, with a field "component1.reference1.functionX" and a field "component1.redundant."

When definitions of the above-described relationships are found at the time of searching the field "component1.vm11," the compiling unit 104 refers to the information shown in the left of FIG. 45. By referring to the information, the compiling unit 104 grasps that the field "component1.reference1.functionX" includes the state element "D2::functionX2" and that a management field of the state element "D2::functionX2" is "D2::component2.functionX."

In addition, the compiling unit 104 grasps that the field "component1.redundant" includes the state element "redundant" and that a management field of the state element "redundant" is "component1.redundant." The compiling unit 104 compiles and returns the grasped information to the planning system as the search source.

FIG. 46 is an explanatory diagram showing an example of communication content to be transmitted and received at the time of a request to gather relationships and at the time of a reply. FIG. 46 shows a request message to gather relationships at the left. Furthermore, FIG. 46 shows a reply message in response to the request to gather relationships at the right. As shown in FIG. 46, an id indicating a state element and an id indicating a management field are put together with "@" interposed therebetween. Information including the items put together with "@" interposed therebetween represents compiled information.

The compiling unit 104 in each management domain compiles information on relationships concerning all the state elements for each management field. FIG. 47 is an explanatory diagram showing an example of recorded information in which relationships have been compiled for each management domain. FIG. 47 shows recorded information in the management domain D1 at the left. FIG. 47 shows recorded information in the management domain D2 at the right.

Next, the compiling unit 104 notifies each management domain having a management field, of information required for procedure planning such as a possible state and a feasible state transition of a state element, for all the state elements. The planning system in each management domain adds the notified information to the state element, to complete a low-level system configuration definition.

The compiling unit 104 inputs the completed low-level system configuration definition to the planning unit 102 (step S2600). After inputting the low-level system configuration definition, the planning system 100a terminates the process of compiling the high-level system configuration definition.

Note that methods to be used by the adjustment unit 103 for the process of extracting a scope of influence and for the process of division into groups for a constraint condition, such as "redundant," have been shown in the present exemplary embodiment. Meanwhile, these methods for a constraint condition are different from respective methods for a prior state constraint. Provided below is a supplementary description of the difference with respect to a constraint condition.

In order to describe a reason for the difference between the methods for the process of extracting a scope of influence, consider the case where there is a constraint condition specifying that, for example, "a state of at least one of related state elements is the state "t"." If the state of one of the state elements becomes the state "f," the state of at least one of the other state elements is required to be changed to the state "t." Therefore, the method for the process of extracting a scope of influence for a constraint condition is different from the method for a prior state constraint.

As described above, a method for determining a scope of influence depends on details of a constraint condition. However, if at least all related state elements are added to the scope of influence, procedure planning is properly performed.

Therefore, assuming that a predetermined state element is to be changed, when searching the scope of influence, the adjustment unit 103 just needs to make a search on the basis of a judgment to the effect that there is a possibility that a constraint condition referring to the state element to be changed may be affected. Conversely, in the case where a predetermined constraint condition is to be changed, the adjustment unit 103 just needs to make a search on the basis of a judgment to the effect that there is a possibility that the change may affect all state elements referred to by the constraint condition to be changed.

Furthermore, similarly, a predetermined constraint condition and all state elements to be referred to are required to belong to the same group in the process of division into groups. In order to cause the constraint condition and all the state elements to be referred to, to belong to the same group, the adjustment unit 103 just needs to make a search simply on the basis of the assumption that there exist, between a predetermined constraint condition and a group of state elements, two edges pointing toward the predetermined constraint condition and the group of state elements in division into strongly connected components.

Note that if conditions for an allowable procedure for changing a system configuration are set in advance in each management domain by use of a constraint condition and the like shown in the present exemplary embodiment, the planning system in each management domain may automatically permit execution of the system configuration change on the premise that the set conditions are not violated.

Furthermore, the planning system may notify a management domain from which the system configuration change has been accepted, that the execution has been permitted. In other words, the entire process from acceptance of a system configuration change to the change across a plurality of management domains is automatically performed.

Note that as with the variation of the first exemplary embodiment, the cooperation unit 101 according to the present exemplary embodiment may also perform a process of anonymization of information. However, information on the ports disclosed to the outside and state elements connected to the ports disclosed to the outside, shown in FIGS. 34 and 35, is not to be subjected to an anonymization process. This is because such information is originally intended to be notified to another management domain.

Communication to be anonymized and reproduced in the present exemplary embodiment includes communication to be performed at the time of finding a management field in step S2300 and communication to be performed at the time of notification to a field on a connection path in step S2400. Furthermore, the communication to be anonymized and reproduced in the present exemplary embodiment also includes communication to be performed at the time of gathering relationships in step S2500 and communication to be performed between the planning system and the combining unit.

Examples of anonymization of the content of the above-described communication are shown in FIGS. 48 to 50. FIG. 48 is an explanatory diagram showing another example of communication content to be transmitted and received at the time of a request to make a search for a management field and at the time of a reply. FIG. 48 shows a request message to make a search for a management field at the left. Furthermore, FIG. 48 shows a reply message in response to the request to make a search for the management field at the right. As shown in FIG. 48, information on a state element has been anonymized.

FIG. 49 is an explanatory diagram showing another example of communication content to be transmitted and received at the time of a request to gather relationships and at the time of a reply. FIG. 49 shows a request message to gather relationships at the left. In addition, FIG. 49 shows a reply message in response to the request to gather relationships at the right. For example, information on a state element and information on a prior state constraint have been anonymized, as shown in FIG. 49.

FIG. 50 is an explanatory diagram showing another example of communication content to be transmitted and received between the cooperation unit and the combining unit. FIG. 50 shows a request message to be transmitted from the cooperation unit to the combining unit at the left. Furthermore, FIG. 50 shows a reply message to be transmitted from the combining unit to the cooperation unit at the right. For example, information on a prior state constraint has been anonymized, as shown in FIG. 50.

[Description of Effect]

When the method of the present exemplary embodiment is used, the planning system is used even in the case where respective systems managed by a plurality of management domains are related to each other. A user can change a system configuration after confirming influence on each management domain.

Furthermore, the planning system according to the present exemplary embodiment can generate a procedure for changing a system configuration by using a high-level system configuration definition even in the case where respective systems managed by a plurality of management domains are related to each other. This is because the compiling unit 104 can convert a high-level system configuration definition into a low-level system configuration definition that can be processed by the adjustment unit 103.

Note that the planning system 100, the planning system 100*a*, the another planning system 110, and the combining unit 120 according to each exemplary embodiment are implemented by, for example, a central processing unit (CPU) that performs a process according to a program stored in a storage medium. That is, the cooperation unit 101, the planning unit 102, the adjustment unit 103, and the compiling unit 104 are implemented by, for example, a CPU that performs a process according to program control.

In addition, each unit in the planning system 100 and the planning system 100*a* according to each exemplary embodiment may be implemented by a hardware circuit. As an example, the cooperation unit 101, the planning unit 102, the adjustment unit 103, and the compiling unit 104 are each implemented by large scale integration (LSI). Furthermore, they may be implemented by a single LSI.

Next, an outline of the present invention will be described. FIG. 51 is a block diagram showing an outline of a cooperative planning system according to the present invention. A cooperative planning system 10 according to the present invention includes: a plurality of planning systems $20_1$ to $20_N$ (for example, the planning systems 100), each of which manages a system configuration; and a generating unit 30 (for example, the combining unit 120) which generates a change procedure in response to a request to change a plurality of system configurations, wherein the generating unit 30: generates the change procedure on the basis of a plurality of system configuration definitions which are inputted from the plurality of planning systems $20_1$ to $20_N$; generates a plurality of partial procedures by dividing the generated change procedure for each procedure which relates to an element of each of the system configurations; with respect to a first partial procedure which includes a first step after which, when execution is completed, execution is commenced of a second step which is included in a second partial procedure, adds, after the first step, a step in which information is inputted to the planning system which executes the second partial procedure, said information indicating the completion of the procedure; and with respect to the second partial procedure, adds, prior to the second step, a step in which information is inputted from the planning system which executes the first partial procedure, said information indicating the completion of the procedure.

With such a configuration, the cooperative planning system can generate a procedure for changing a configuration of a system that affects a plurality of management domains, as a set of partial procedures generated in the respective management domains.

Furthermore, the planning systems $20_1$ to $20_N$, may each include an input unit (for example, the cooperation unit 101) which inputs, to the generating unit 30, the system configuration definition managed by the planning system after processing the system configuration definition. In addition, the input unit may extract a part to be changed from the system configuration definition managed by the planning system, on the basis of the request to change the plurality of system configurations, and input, to the generating unit 30, the extracted part to be changed.

With such a configuration, the cooperative planning system can generate a procedure for changing a system configuration at a higher speed with higher confidentiality.

In addition, the input unit may input the extracted part to be changed, to the generating unit 30 after dividing the extracted part into one or more strongly connected components.

With such a configuration, the cooperative planning system can generate a procedure for changing a system configuration at a higher speed.

Furthermore, the input unit may input, to the generating unit 30, details of the system configuration definition managed by the planning system after anonymizing the details of the system configuration definition.

With such a configuration, the cooperative planning system can generate a procedure for changing a system configuration with higher confidentiality.

Moreover, the generating unit 30 may input each of the plurality of partial procedures generated, to the input unit of each of the planning systems $20_1$ to $20_N$, and information required to execute the input partial procedure may be input to the input unit from another planning system.

With such a configuration, the cooperative planning system can change a system configuration with the planning systems coordinated with each other.

Furthermore, the input unit may convert anonymized information included in the input partial procedure, into original information.

With such a configuration, the cooperative planning system can change a system configuration with higher confidentiality.

Moreover, the system configuration definition managed by the planning system is a high-level system configuration definition including: a component that is definition information including one or more groups of elements of the system configuration and relationships between the elements; a port that is definition information indicating a point for connecting the component with another component; and a wire that is definition information regarding connection between the ports. In addition, the planning systems $20_1$ to $20_N$ may each include a conversion unit (for example, the compiling unit 104) which converts the high-level system configuration definition into a low-level system configuration definition including the groups of elements and the relationships between the elements.

With such a configuration, the cooperative planning system can generate a procedure for changing a system configuration on the basis of a system configuration definition generated manually with more ease.

In addition, the high-level system configuration definition managed by each of the planning systems $20_1$ to $20_N$ may include information on the port in the high-level system configuration definition managed by another planning system.

With such a configuration, the cooperative planning system can generate a procedure for changing a system configuration on the basis of a high-level system configuration definition across a plurality of management domains.

Note that the planning systems $20_1$ to $20_N$ and the generating unit 30 may be communicably connected via a communication network. In addition, the planning systems $20_1$ to $20_N$ may each be communicably connected to an input/output device and a storage device external thereto via a communication network. Furthermore, the input unit may be communicably connected to another planning system via a communication network.

Moreover, when accepting a request to change a system configuration from a user via the input/output device, the planning systems $20_1$ to $20_N$ may perform procedure planning by communicating with all related planning systems via the input unit and using any one of the planning systems as the generating unit 30.

For example, a planning system that has accepted a request to change a system configuration may be used as the generating unit 30. Alternatively, a planning system managing the largest number of state elements may be used as the generating unit 30 after a single check of the number of state elements managed by each of the planning systems $20_1$ to $20_N$.

The planning system used as the generating unit 30 generates partial procedures by gathering state elements from each of the planning systems $20_1$ to $20_N$, performing procedure planning, and dividing a result of performing the procedure planning. Then, the planning system used as the generating unit 30 returns the generated partial procedures to each of the planning systems $20_1$ to $20_N$.

Furthermore, the definition of the system configuration managed by each of the planning systems $20_1$ to $20_N$ may include one or more constituent elements and relationships between the definitions of the system configurations. Each constituent element may include information on one or more possible states and feasible state transitions of the constituent element. The relationship between the definitions of the system configurations may indicate at least one of designation of a state of a constituent element in a definition of another system configuration, as a prior constraint for making a state transition of a constituent element in a system configuration definition; designation of a constituent element in a definition of another system configuration required for a conditional judgment in a system configuration definition; and designation of a control module in another system configuration definition, for controlling a constituent element in a system configuration definition.

In addition, any one of the plurality of planning systems $20_1$ to $20_N$ may indicate, to the other planning systems, a system configuration definition to be input to the generating unit 30.

The present invention has been described above with reference to the exemplary embodiments and examples. However, the present invention is not limited to the above-described exemplary embodiments and examples. Various modifications that can be understood by those skilled in the art can be made to the configurations and details of the present invention, within the scope of the present invention.

The present application claims priority based on Japanese Patent Application No. 2016-205841, filed Oct. 20, 2016, the disclosure of which is incorporated herein by reference in its entirety.

In addition, a part or all of the above-described exemplary embodiments can also be described as the following supplementary notes, but are not limited to the following.

(Supplementary note 1) A cooperative planning system including: a plurality of planning systems, each of which manages a system configuration; and a generating unit which generates a change procedure in response to a request to change a plurality of system configurations, wherein the generating unit: generates the change procedure on the basis of a plurality of system configuration definitions which are inputted from the plurality of planning systems; generates a plurality of partial procedures by dividing the generated change procedure for each procedure which relates to an element of each of the system configurations; with respect to a first partial procedure which includes a first step after which, when execution is completed, execution is commenced of a second step which is included in a second partial procedure, adds, after the first step, a step in which information is inputted to the planning system which executes the second partial procedure, said information indicating the completion of the procedure; and with respect to the second partial procedure, adds, prior to the second step, a step in which information is inputted from the planning system which executes the first partial procedure, said information indicating the completion of the procedure.

(Supplementary note 2) The cooperative planning system according to supplementary note 1, wherein the planning system includes an input unit that inputs, to the generating unit, the system configuration definition managed by the planning system after processing the system configuration definition, and the input unit: extracts a part to be changed from the system configuration definition managed by the planning system, on the basis of the request to change the plurality of system configurations; and inputs, to the generating unit, the extracted part to be changed.

(Supplementary note 3) The cooperative planning system according to supplementary note 2, wherein the input unit inputs, to the generating unit, the extracted part to be changed, after dividing the extracted part into one or more strongly connected components.

(Supplementary note 4) The cooperative planning system according to supplementary note 2 or 3, wherein the input unit inputs, to the generating unit, details of the system configuration definition managed by the planning system after anonymizing the details of the system configuration definition.

(Supplementary note 5) The cooperative planning system according to any one of supplementary notes 2 to 4, wherein the generating unit inputs each of the plurality of partial procedures generated, to the input unit of each planning system, and information required to execute the input partial procedure is input to the input unit from another planning system.

(Supplementary note 6) The cooperative planning system according to supplementary note 5, wherein the input unit converts anonymized information included in the input partial procedure, into original information.

(Supplementary note 7) The cooperative planning system according to any one of supplementary notes 1 to 6, wherein the system configuration definition managed by the planning system is a high-level system configuration definition including: a component that is definition information including one or more groups of elements of the system configuration and relationships between the elements; a port that is definition information indicating a point for connecting the component with another component; and a wire that is definition information regarding connection between the ports, and the planning system includes a conversion unit which converts the high-level system configuration definition into a low-level system configuration definition including the groups of elements and the relationships between the elements.

(Supplementary note 8) The cooperative planning system according to supplementary note 7, wherein the high-level system configuration definition managed by the planning system includes information on the port in the high-level system configuration definition managed by another planning system.

(Supplementary note 9) A cooperative planning method to be executed in a cooperative planning system that includes a plurality of planning systems, each of which manages a system configuration, and generates a change procedure in response to a request to change a plurality of system configurations, the method including: generating the change procedure on the basis of a plurality of system configuration definitions which are inputted from the plurality of planning systems; generating a plurality of partial procedures by dividing the generated change procedure for each procedure which relates to an element of each of the system configurations; with respect to a first partial procedure which includes a first step after which, when execution is completed, execution is commenced of a second step which is included in a second partial procedure, adding, after the first step, a step in which information is inputted to the planning system which executes the second partial procedure, said information indicating the completion of the procedure; and with respect to the second partial procedure, adding, prior to the second step, a step in which information is inputted from the planning system which executes the first partial procedure, said information indicating the completion of the procedure.

(Supplementary note 10) A cooperative planning program to be executed in a computer that generates a change procedure in response to a request to change a plurality of system configurations, the computer including a plurality of planning systems, each of which manages a system configuration, the program causing the computer to perform: a first generation process of generating the change procedure on the basis of a plurality of system configuration definitions which are inputted from the plurality of planning systems; a second generation process of generating a plurality of partial procedures by dividing the generated change procedure for each procedure which relates to an element of each of the system configurations; a first adding process of, with respect to a first partial procedure which includes a first step after which, when execution is completed, execution is commenced of a second step which is included in a second partial procedure, adding, after the first step, a step in which information is inputted to the planning system which executes the second partial procedure, said information indicating the completion of the procedure; and a second adding process of, with respect to the second partial procedure, adding, prior to the second step, a step in which information is inputted from the planning system which executes the first partial procedure, said information indicating the completion of the procedure.

(Supplementary note 11) A cooperative planning apparatus including: a generating unit which generates a change procedure in response to a request to change a plurality of system configurations, wherein the generating unit: generates the change procedure on the basis of a plurality of system configuration definitions which are inputted from a plurality of planning systems, each of which manages a system configuration; generates a plurality of partial procedures by dividing the generated change procedure for each procedure which relates to an element of each of the system configurations; with respect to a first partial procedure which includes a first step after which, when execution is completed, execution is commenced of a second step which is included in a second partial procedure, adds, after the first step, a step in which information is inputted to the planning system which executes the second partial procedure, said information indicating the completion of the procedure; and with respect to the second partial procedure, adds, prior to the second step, a step in which information is inputted from the planning system which executes the first partial procedure, said information indicating the completion of the procedure.

REFERENCE SIGNS LIST

10 Cooperative planning system
$20_1$ to $20_N$, 100, 100a Planning system
30 Generating unit
101 Cooperation unit
102 Planning unit
103 Adjustment unit
104 Compiling unit
110 Another planning system
120 Combining unit
200 Input/output device
300 Storage device
400 Control device

What is claimed is:

1. A cooperative planning system comprising:
a plurality of interconnected and interdependent planning systems connected to each other over a communication network, each of which being configured to manage a system configuration of at least one of the plurality of planning systems; and
a generator comprising a generating processor and a storage medium having program instructions stored therein, that when executed by the generating processor are configured to automatically cause performance of operations comprising:
receiving, as inputs from the plurality of planning systems, system configuration definitions, which are represented as a set of constituent state elements of the plurality of planning systems, the system configuration definitions being initially stored across the plurality of planning systems;
generating a change procedure in response to a request to change a plurality of system configurations on the basis of the plurality of system configuration definitions, the change procedure including
determining the elements of the system configurations to be changed according to the change request;
performing a search process of finding all of the state elements of the set of constituent state elements of the plurality of planning systems which are represented as nodes, that can be reached from a single starting state element represented as a node; and
generating a plurality of partial procedures by dividing the generated change procedure, each of the plurality of partial procedures relating to an element of each of the system configurations, the plurality of partial procedures including a first partial procedure which includes a first step, and a second partial procedure which includes a second step, the first partial procedure including a specification of the second partial procedure and a notification of authorization to perform the second partial procedure;
wherein at least one planning system of the plurality of planning systems is configured to execute the first partial procedure, including the first step, and the second partial procedure, including the second step;
wherein, following execution of the first step of the first partial procedure, the generating processor is further configured to operate to input information into the planning system which executes the second partial procedure, the information indicating completion of the execution of the first partial procedure,
wherein, prior to the execution of the second step of the second partial procedure, the generating processor is further configured to operate to receive information from the planning system which executes the first partial procedure, the information indicating completion of the execution of the first partial procedure, and
wherein the generator is communicably connected to the plurality of planning systems via the communication network.

2. The cooperative planning system according to claim 1, wherein each of the plurality of planning systems includes a planning processor and another storage medium having program instructions stored therein, that when executed by the planning processor cause performance of operations comprising: inputting into the generator, the system configuration definitions,
wherein the planning processor is further configured to operate to: extract a part to be changed from the system configuration definitions on the basis of the request to change the plurality of system configurations; and
input, to generator, the extracted part to be changed.

3. The cooperative planning system according to claim 2, wherein
the planning processor is further configured to operate to input, to the generator, the extracted part to be changed, after dividing the extracted part into one or more strongly connected components.

4. The cooperative planning system according to claim 2, wherein the planning processor is further configured to operate to input, to the generator, details of a system configuration definition of the system configuration definitions, which is managed by a planning system of the plurality of planning systems, after anonymizing the details of the system configuration definition.

5. The cooperative planning system according to claim 2, wherein the generator is further configured to operate to input each of the plurality of partial procedures generated, to each planning system, and wherein the cooperative planning system is configured such that information required to execute an input partial procedure is input from another planning system of the plurality of planning systems.

6. The cooperative planning system according to claim 5, wherein the planning processor is further configured to operate to convert anonymized information included in the input partial procedure, into original information.

7. The cooperative planning system according to claim 1, wherein a system configuration definition of the system configuration definitions is managed by a planning system of the plurality of planning systems, is a high-level system configuration definition including: a component that is definition information including one or more groups of elements of the system configuration and relationships between the elements; a port that is definition information indicating a point for connecting the component with another component; and a wire that is definition information regarding connection between the ports, and wherein the planning processor is further configured to operate to convert the high-level system configuration definition into a low-level system configuration definition including the groups of elements and the relationships between the elements.

8. The cooperative planning system according to claim 7, wherein the high-level system configuration definition managed by the planning system includes information on the port in the high-level system configuration definition managed by another planning system of the plurality of planning systems.

9. A cooperative planning method to be executed in a cooperative planning system that includes a plurality of interconnected and interdependent planning systems connected to each other over a communication network, each of which being configured to manage a system configuration of at least one of the plurality of planning systems, and to generate a change procedure in response to a request to change a plurality of system configurations, the method comprising:

receiving, as inputs from the plurality of planning systems, system configuration definitions, which are represented as a set of constituent state elements of the plurality of planning systems, the system configuration definitions being initially stored across the plurality of planning systems;

receiving the request to change a plurality of system configurations;

generating the change procedure on the basis of the plurality of system configuration definitions, the change procedure including;

determining the elements of the system configurations to be changed according to the change request;

performing a search process of finding all of the state elements of the set of constituent state elements of the plurality of planning systems which are represented as nodes, that can be reached from a single starting state element represented as a node;

generating a plurality of partial procedures by dividing the generated change procedure for each procedure, each of the plurality of partial procedures relating to an element of each of the system configurations, the plurality of partial procedures including a first partial procedure which includes a first step, and a second partial procedure which includes a second step; and executing, by at least one of the plurality of planning systems, the first partial procedure, including the first step, and the second partial procedure, including the second step, the first partial procedure including a specification of the second partial procedure and a notification of authorization to perform the second partial procedure;

wherein the method further comprises:

following execution of the first step of the first partial procedure, inputting information into the planning system which is configured to execute the second partial procedure, the information indicating completion of the execution of the first partial procedure, prior to the execution of the second step of the second partial procedure, receiving information from the planning system is configured to execute the first partial procedure, the information indicating completion of the execution of the first partial procedure, and wherein the generation of the plurality of partial procedures is performed by a generator comprising a generating processor which is communicably connected to the plurality of planning systems via the communication network.

10. A non-transitory computer-readable recording medium having recorded therein a cooperative planning program to be executed in a computer that generates a change procedure in response to a request to change a plurality of system configurations, the computer including a plurality of interconnected and interdependent planning systems connected to each other over a communication network, each of which being configured to manage a system configuration of at least one of the plurality of planning systems, the program causing the computer to perform:

a first reception process of receiving, as inputs from the plurality of planning systems, system configuration definitions, which are represented as a set of constituent state elements of the plurality of planning systems, the system configuration definitions being initially stored across the plurality of planning systems;

a second reception process of receiving the request to change a plurality of system configurations;

a first generation process of generating the change procedure on the basis of the plurality of system configuration definitions, the change procedure including determining the elements of the system configurations to be changed according to the change request;

performing a search process of finding all of the state elements of the set of constituent state elements of the plurality of planning systems which are represented as nodes, that can be reached from a single starting state element represented as a node;

a second generation process of generating a plurality of partial procedures by dividing the generated change procedure for each procedure, each of the plurality of partial procedures relating to an element of each of the system configurations, the plurality of partial procedures including a first partial procedure which includes a first step, and a second partial procedure which includes a second step, the first partial procedure including a specification of the second partial procedure and a notification of authorization to perform the second partial procedure;

a first execution process of executing, by at least one of the plurality of planning systems, the first partial procedure, including the first step, and the second partial procedure, including the second step, wherein the program further causes the computer to perform following execution of the first step of the first partial procedure, a first input process of inputting information into the planning system which executes the second partial procedure, the information indicating completion of the execution of the first partial procedure, prior to the execution of the second step of the second partial procedure, a third reception process of receiving information from the planning system which executes the first partial procedure, the information indicating completion of the execution of the first partial procedure, and wherein the first and second generation processes are performed by a generator comprising a generating processor which is communicably connected to the plurality of planning systems via the communication network.

11. The cooperative planning system according to claim 3, wherein the planning processor is further configured to operate to input, into the generator, details of a system configuration definition, which is managed by a planning system of the plurality of planning systems, after anonymizing the details of the system configuration definition.

12. The cooperative planning system according to claim 3, wherein the planning processor is further configured to operate to input each of the plurality of partial procedures generated, to each planning system, and wherein information required to execute an input partial procedure is input from another planning system.

13. The cooperative planning system according to claim 4, wherein the planning processor is further configured to operate to input each of the plurality of partial procedures generated to each planning system, and wherein information required to execute an input partial procedure is from another planning system.

14. The cooperative planning system according to claim 11, wherein the planning processor is further configured to operate to input each of the plurality of partial procedures generated to each planning system, and wherein information required to execute an input partial procedure is input from another planning system.

15. The cooperative planning system according to claim 12, wherein the planning processor is further configured to operate to convert anonymized information included in the input partial procedure, into original information.

16. The cooperative planning system according to claim 13, wherein the planning processor is further configured to operate to convert anonymized information included in the input partial procedure, into original information.

17. The cooperative planning system according to claim 14, wherein the planning processor is further configured to operate to convert anonymized information included in the input partial procedure, into original information.

18. The cooperative planning system according to claim 2, wherein a system configuration definition of the system configuration definitions is managed by a planning system of the plurality of planning systems, is a high-level system configuration definition including: a component that is definition information including one or more groups of elements of the system configuration and relationships between the elements; a port that is definition information indicating a point for connecting the component with another component; and a wire that is definition information regarding connection between the ports, and the planning processor is further configured to operate to convert the high-level system configuration definition into a low-level system configuration definition including the groups of elements and the relationships between the elements.

19. The cooperative planning system according to claim 3, wherein a system configuration definition of the system configuration definitions is managed by a planning system of the plurality of planning systems, is a high-level system configuration definition including: a component that is definition information including one or more groups of elements of the system configuration and relationships between the elements; a port that is definition information indicating a point for connecting the component with another component; and a wire that is definition information regarding connection between the ports, and the planning processor is further configured to operate to convert the high-level system configuration definition into a low-level system configuration definition including the groups of elements and the relationships between the elements.

20. The cooperative planning system according to claim 4, wherein a system configuration definition of the system configuration definitions is managed by a planning system of the plurality of planning systems, is a high-level system configuration definition including: a component that is definition information including one or more groups of elements of the system configuration and relationships between the elements; a port that is definition information indicating a point for connecting the component with another component; and a wire that is definition information regarding connection between the ports, and the planning processor is further configured to operate to convert the high-level system configuration definition into a low-level system configuration definition including the groups of elements and the relationships between the elements.

\* \* \* \* \*